US 8,485,661 B2

(12) United States Patent
Yoo et al.

(10) Patent No.: US 8,485,661 B2
(45) Date of Patent: *Jul. 16, 2013

(54) ADJUSTABLE FLICKER RATE VISION TRAINING AND TESTING

(75) Inventors: Herb Yoo, Beaverton, OR (US); Alan W. Reichow, Beaverton, OH (US)

(73) Assignee: Nike, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,145

(22) Filed: Jul. 11, 2011

(65) Prior Publication Data

US 2011/0282252 A1 Nov. 17, 2011

Related U.S. Application Data

(63) Continuation-in-part of application No. 13/009,417, filed on Jan. 19, 2011, which is a continuation-in-part of application No. 12/829,878, filed on Jul. 2, 2010, which is a continuation-in-part of application No. 11/514,822, filed on Aug. 31, 2006, now Pat. No. 7,828,434.

(51) Int. Cl.
*G02C 7/02* (2006.01)
(52) U.S. Cl.
USPC ............ 351/159.01; 351/200; 351/246
(58) Field of Classification Search
USPC ............ 351/159.01, 41, 246, 200, 205
See application file for complete search history.

(56) References Cited

U.S. PATENT DOCUMENTS

| | | | |
|---|---|---|---|
| 5,276,539 A | 1/1994 | Humphrey | |
| 5,452,026 A * | 9/1995 | Marcy, III | 351/45 |
| 5,805,261 A | 9/1998 | Houston et al. | |
| 6,493,154 B1 | 12/2002 | Humphrey | |
| 6,511,175 B2 * | 1/2003 | Hay et al. | 351/45 |
| 6,932,090 B1 | 8/2005 | Reschke et al. | |
| 2001/0050754 A1 | 12/2001 | Hay et al. | |
| 2002/0140899 A1 | 10/2002 | Blum et al. | |
| 2008/0055541 A1 | 3/2008 | Coulter | |
| 2008/1005554 | 3/2008 | Coulter et al. | |
| 2009/0251660 A1 | 10/2009 | Figler et al. | |
| 2011/0032476 A1 | 2/2011 | Brown et al. | |

FOREIGN PATENT DOCUMENTS

| | | |
|---|---|---|
| GB | 2128362 | 4/1984 |
| JP | 64035412 | 2/1989 |
| WO | 9517227 | 6/1995 |

OTHER PUBLICATIONS

Non-Final Office Action in US Application No. 13/009,417 mailed Mar. 19, 2012, 47 pages.
Non-Final Office Action in U.S. Appl. No. 12/829,878 mailed Mar. 12, 2012, 28 pages.

(Continued)

*Primary Examiner* — James Greece
(74) *Attorney, Agent, or Firm* — Shook Hardy & Bacon LLP

(57) ABSTRACT

A vision training system comprises a display device configured to display dynamic visual content having a flicker rate, a flicker generator configured to adjust the flicker rate according to a duty cycle, a visual signal source configured to provide a visual signal in the form of dynamic content to the flicker generator, or, alternatively, to the display device, and a receiver configured to receive indications that the flicker rate should be adjusted.

20 Claims, 15 Drawing Sheets

OTHER PUBLICATIONS

European Search Report in International Application No. 12151639.7-2217, dated Apr. 12, 2012, 7 pages.
PCT Search Report mailed Nov. 14, 2011, pp. 1-10.
Non-Final Office Action in U.S. Appl. No. 12/829,878 mailed Sep. 25, 2012, 23 pages.
Notification of Transmittal of the International Search Report and the Written Opinion of the International Searching Authority, or the Declaration in PCT/US2012/46284 dated Sep. 12, 2012, 11 pages.
Non-Final Office Action in U.S. Appl. No. 13/009,417 mailed Oct. 2, 2012, 32 pages.

* cited by examiner

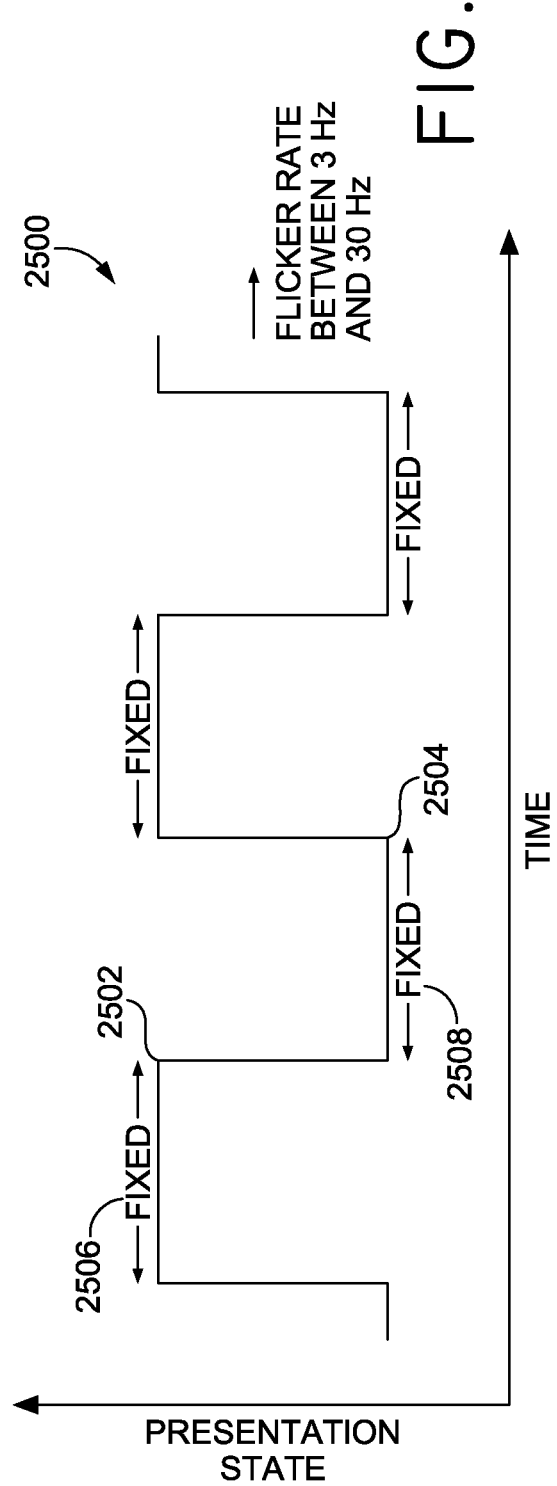

ADJUSTABLE FLICKER RATE VISION TRAINING AND TESTING

CROSS-REFERENCE TO RELATED APPLICATION

This application, having Ser. No. 13/180,145, is a Continuation-in-Part of copending U.S. Nonprovisional application having Ser. No. 13/009,417, filed on Jan. 19, 2011, entitled "Adjustable Spectral Transmittance Eyewear," which is a Continuation-in-Part of copending U.S. Nonprovisional application having Ser. No. 12/829,878, filed on Jul. 2, 2010, entitled "Adjustable Spectral Transmittance Curved Lens Eyewear," which is a Continuation-in-Part of Ser. No. 11/514, 822, granted as U.S. Pat. No. 7,828,434, filed Aug. 31, 2006, entitled "Zone Switched Sports Training Eyewear." The entirety of each of the aforementioned applications/patent is incorporated by reference herein.

BACKGROUND

Vision training has applicability in a wide variety of fields. The ability to accurately perceive and respond to the position and motion of objects and images in both central fields of vision and peripheral fields of vision is important not only in the sports arena, but also in the occupational world. For example, physicians in general, and specifically surgeons, rely heavily on their vision when practicing their profession. Surgeons are called upon to perform delicate surgeries, either traditionally or through a laparoscope, and improved visual performance is a desired advantage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present invention relate to a system for training vision by using a display device that presents dynamic content to a user, where the dynamic content may be presented with a flicker rate between 3 Hz and 30 Hz. A flicker generator may be used to adjust the flicker rate according to a duty cycle, where an associated cycle may comprise a presentation state and a non-presentation state. In addition, a receiver may be configured to receive indications that the flicker rate should be adjusted. This indication then may be used by the flicker generator to adjust the flicker rate.

In another aspect, the present invention provides a vision training system comprising a first display area that is electrically switchable from a first visual output to a second visual output. This cycling between the first and second visual output may produce a first flicker rate. In addition, there is a second display area that is electrically switchable from a third visual output to a fourth visual output. This cycling between the third and fourth visual output may produce a second flicker rate. The vision training system may also comprise a display driver that controls the first flicker rate and the second flicker rate so that the rates have a frequency between 3 Hz and 40 Hz. Additionally, the vision training system may also comprise a retaining device configured to retain the first display area and the second display area at a position relative to a user.

In yet another aspect, the present invention provides a vision training system comprising a display device that is able to display dynamic visual content to a user, where the user perceives a flicker rate of the dynamic content. The system may also have a display driver that can adjust the flicker rate based on receiving an indication that the flicker rate should be adjusted. The flicker rate may be defined by a duty cycle that may cycle through a presentation state and a non-presentation state. The flicker rate may be adjusted by varying the duration of the presentation state, the duration of the non-presentation state, or the duration of the cycle. In addition, the vision training system may also have a receiver configured to receive indications regarding flicker rate adjustments. The display driver may adjust the flicker rate according to the indication such that the duty cycle is between 3 Hz and 40 Hz.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIGS. 23-25 illustrate examples of cycles in accordance with an embodiment of the present invention.

DETAILED DESCRIPTION

Figure 1:
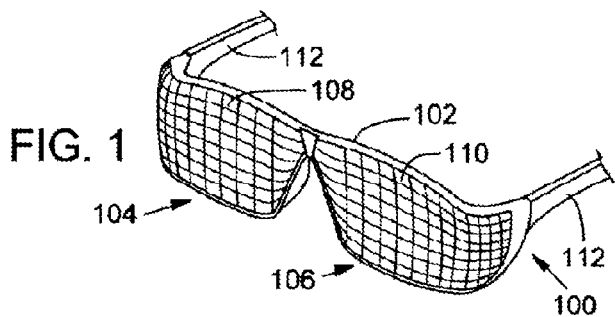
FIG. 1 illustrates a representative example of vision training eyewear in accordance with embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps, combinations of steps, components, features, and devices similar to the ones described in this document, in conjunction with other present or future technologies.

Embodiments of the present invention relate to a system for training vision by using a display device that presents dynamic content to a user, where the dynamic content may be presented with a flicker rate having a frequency between 3 Hz and 30 Hz. A flicker generator may be used to adjust the flicker rate according to a duty cycle and/or frequency, where an associated cycle may comprise a presentation state and a non-presentation state. In addition, a receiver may be configured to receive indications that the flicker rate should be adjusted. This indication then may be used by the flicker generator to adjust the flicker rate.

In another aspect, the present invention provides a vision training system comprising a first display area that is electrically switchable from a first visual output to a second visual output. This cycling between the first and second visual output may produce a first flicker rate. In addition, there is a second display area that is electrically switchable from a third visual output to a fourth visual output. This cycling between the third and fourth visual output may produce a second flicker rate. The vision training system may also comprise a display driver that controls the first flicker rate and the second flicker rate so that the rates are between 3 Hz and 40 Hz. Additionally, the vision training system may also comprise a retaining device configured to retain the first display area and the second display area.

In yet another aspect, the present invention provides a vision training system comprising a display device that is able to display dynamic visual content to a user, where the user perceives the dynamic content as having a flicker rate. The system may also have a display driver that can adjust the flicker rate based on receiving an indication that the flicker rate should be adjusted. The flicker rate may be defined by a duty cycle that may cycle through a presentation state and a non-presentation state to produce a flicker rate between 3 Hz and 40 Hz. The flicker rate may be adjusted by varying the duration of the presentation state, the duration of the non-presentation state, or the duration of the cycle. In addition, the vision training system may also have a receiver configured to receive indications regarding flicker rate adjustments.

Having briefly described an overview of embodiments of the present invention, an exemplary operating environment suitable for implementing embodiments hereof is described below.

As used herein, the singular forms "a," "an," and "the" include the plural forms unless the context clearly dictates otherwise. Additionally, the term "includes" means "comprises." The described systems, apparatus, and methods should not be construed as limiting in any way. Instead, the present disclosure is directed toward all novel and nonobvious features and aspects of the various disclosed embodiments, alone and in various combinations and sub-combinations with one another. The disclosed systems, methods, and apparatus are not limited to any specific aspect or feature or combination thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show all the various ways in which the disclosed systems, methods, and apparatus can be used in conjunction with other systems, methods, and apparatus.

Vision training systems comprise eyewear configured to selectively obscure a portion of a trainee's field of view, and a pattern generator configured to select and temporally vary the obscured portion of the trainee's field of view. A computer readable medium such as random access memory (RAM) can be configured to record the obscured portions of the field of view selected by the pattern generator, or to store a sequence of field obscuration patterns to which the trainee is to be exposed. In some examples, the pattern generator temporally varies the obscured portion of the field of view by keeping a transmissive state duration approximately constant and altering a substantially non-transmissive state duration. Obscuration patterns can be selected to obscure portions of a visual field at or near a line of sight (such as a normal line of sight or an activity specific line of sight), or to obscure portions of the visual field displaced from the line of sight. In some examples, moiré patterns are used.

Referring to FIG. 1, training eyewear 100 includes a frame 102 that is adapted to retain a first lens 104 and a second lens 106. In some examples, the lenses 104, 106 can provide optical power such as typically used to correct nearsightedness, farsightedness, astigmatism, or other visual defects, but the lenses 104, 106 can also be configured to provide little or no optical power for such corrections. The lenses 104, 106 include respective pluralities of segments or zones such as representative zones 108, 110 that are labeled in FIG. 1. For convenience in the following description, all zones of the lenses 104, 106 are referred to occasionally as zones 108, 110, respectively. The zones 108, 110 have optical properties that can be adjusted, selected, or established with, for example, electrical signals applied to the segments (zones). For example, the segments can be defined with liquid crystal materials such as polymer dispersed liquid crystals, nematic liquid crystals, cholesteric liquid crystals, or other electrically switchable optical materials that are situated between transparent conductive layers that are patterned to produce selected segment geometries. Liquid crystal materials are convenient due to their relatively low drive voltages, but other electro-optical materials such as, for example, electrophoretic materials or so-called "electronic inks" that have been developed for flexible flat panel displays can be used.

While the eyewear of FIG. 1 includes separate lenses for a left eye and a right eye, in other examples a single lens pane can be provided that is situated appropriately with respect to each eye. In some examples, a lens or portions of a lens pane for one eye is configured to substantially obscure vision through the associated eye. Such obscuration can be achieved with, for example, opaque, translucent, or other light blocking and/or light scattering lens regions or lens pane regions. In some examples, one of the lenses or lens pane regions can be patterned so as to be selectively switchable to be substantially obscuring or substantially transparent without being configured to display patterned obscurations.

The zones 108, 110 can be electrically coupled to a lens driver that is secured to, for example, a temple piece 112 or other portion of the eyewear, or that is independently locatable so that the driver can be secured to, for example, an armband, a pocket, or a waistband as may be convenient. A lens driver can provide electrical control signals that actuate some or all of the zones to become substantially opaque, transparent, or otherwise vary a zone transmittance. The zones can be configured to provide electrically variable spectral transmittances, so that a spectrum of transmitted light varies with the applied electrical drive. Stated differently, adjustable spectral transmittance is adjusting, along a spectrum of light intensity, an amount of light that is conveyed through a lens. Therefore, adjusting the spectral transmittance may range from completely transparent (no electronic adjustment/full electrical adjustment) to completely obscuring (full electronic adjustment/no electrical adjustment). A pattern or arrangement of zones and a manner of actuation can be selected by the lens driver with a pattern generator or controller that is provided as part of the lens driver or provided separately. A remote lens driver or pattern generator can be coupled to the eyewear with an electrical cable. In some examples, patterns can be transmitted wirelessly to the eyewear so that a trainer can select an appropriate zone actuation pattern without interfering with the wearer's activity.

The zones 108, 110 can be activated in a variety of zone actuation patterns based on a geometrical arrangement of activated zones, a temporal sequence in which zones are actuated, a rate of zone actuation, a progression of zone patterns, or other spatially and/or temporally variable or fixed configurations. For example, some or all zones can be activated to obscure a wearer's vision in a temporal sequence so that initially the relative duration of obscuration is small and the duration of the obscuration gradually increases. Zones can be selected to provide obscuration based on selected activity-specific or sport-specific situations. For example, in training a batter for improved central vision to track a baseball, a central portion of a field of view can be partially or completely obscured with a static or time varying adjustment of zone transmittances. Although in this example, central vision is trained, the activated zones may not be central zones of eyewear lenses, but can be selected based on the relative head position and line of sight of the batter with respect to pitch trajectory.

Zones or selected groups of zones (e.g., lens portions) can be selected to obscure portions of a wearer's field of view. For convenience, an arrangement of one or more zones is referred to herein as an obscuration pattern. An extent to which a zone or an obscuration pattern modulates light transmission or light emission is referred to as an obscuration intensity. A series of one or more activated obscuration patterns is referred to as a sequence. A rate at which an activation pattern or patterns in a sequence are activated can be referred to as a strobe rate. A strobe rate can be a fixed or variable frequency. In some examples, the same or similar patterns and sequences are directed to a left lens and a right lens, but different patterns, sequences, and timings can be provided to the different lenses. Sequences and patterns can also be applied to lenses with different phases. For example, a pattern can be activated at a left lens, and then, upon partial or complete deactivation of the pattern, a corresponding or different pattern can be activated at a right lens. In some examples, actuation of patterns on a left and right lens is substantially simultaneous (in phase), while in other examples one is activated only when the other is deactivated (out of phase).

Figure 2:
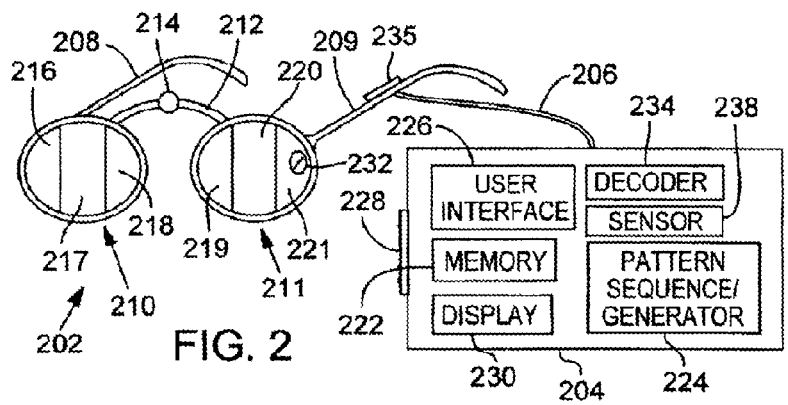
FIG. 2 illustrates a vision training system that includes vision training eyewear in accordance with embodiment of the present invention.

A representative vision training system that includes switchable eyewear 202 (also referred to herein as curved eyewear) and a control system 204 is illustrated in FIG. 2. The control system 204 is coupled to the eyewear 202 with a flexible electrical cable 206 that is configured to communicate electrical signals to and from the eyewear 202. The eyewear 202 includes temple pieces 208, 209, lenses 210, 211 and a bridge 212. The lenses 210, 211 are typically retained by lens rims defined in a frame front that also includes the bridge 212, but other eyewear configurations such as rimless eyewear can be used. A light sensor 214 can be situated in or on the bridge 212 or other location on the eyewear 202. As shown in FIG. 2, the lenses 210, 211 include zones 216, 217, 218 and 219, 220, 221, respectively, but more zones or different arrangements of zones can be provided.

The control system 204 includes a remote lens driver/decoder 234 that is adapted to provide suitable electrical signals to the lens zones 216-221. In some examples, the lens driver 234 is configured to provide electrical signals by selectively addressing the zones row by row or column by column as is customary in addressing liquid crystal display panels. For lenses having only a few zones, each zone can be individually addressable with dedicated conductors. It can be convenient to provide signal decoding or distribution on the eyewear to simplify electrical connections to the control system 204 to avoid, for example, the need to provide multiple row and column signals over the cable 206. In some examples, the control system 204 or some portions thereof are secured to or integrated into the bridge, temple pieces, or other portions of the eyewear 202. In FIG. 2, a frame-mounted decoder 235 is situated on the left temple piece 209. In other examples, the control system or portions thereof are configured for attachment to an eyewear user's clothing, body, or equipment.

The control system 204 can also include a memory 222 and a pattern generator/sequencer 224. The memory 222 can be configured to store obscuration patterns and temporal sequences for activation of such patterns as well as to record training data corresponding to the durations and sequences in which the eyewear has been used in training sessions. The pattern generator/sequencer 224 can be configured to determine pre-established pattern sequences or obscuration patterns for use. In addition, patterns and sequences can be modified or adapted in response to, for example, input commands or other use inputs received via a user interface 226. In some examples, the user interface 226 is configured for selection of patterns and sequences, and can include one or more user controls such as knob, sliders, push buttons, or other input devices. Typical adjustments relate to a rate at which a particular pattern is repeated or a rate at which a sequence of patterns is provided. For example, an obscuration pattern can be strobed at a high rate (greater than about 30 Hz) so that the strobing is noticed by the wearer primarily as a reduced transmitted light intensity. Alternatively, a pattern can be strobed at a rate at which the wearer notices an interval in which her vision is impeded. Typically rates less than about 5 Hz are associated with noticeable obscurations. A constant strobe rate is unnecessary in some exemplary aspects. For example, a strobe rate can vary from a high rate to a low rate so that the visual obscuration presented to the wearer increases, increasing the visual demands on the wearer. Such variable frequency drive can be referred to as a "chirped" drive.

An external input/output connection 228 such as a Universal Serial Bus (USB) or other communication connection can be provided. Such a connection can be coupled to the pattern generator/sequencer 224 to provide or adjust patterns and sequences available for use. Additional patterns and sequences can also be received from the connection 228 for storage in the memory 222. In some examples, a vision training schedule can be transferred to the control system 204 for one or more future training sessions. The training schedule can be transferred from the athlete's computer, or forwarded to the athlete from a trainer over a network such as the Internet. In addition, data concerning usage can be delivered to the connection 228 for inclusion in, for example, a record of an athlete's training schedule. Such a record can be forwarded to a coach or trainer via a network such as the Internet or using email or instant messaging.

A display controller 230 is configured to control a display portion 232 of the lens 211. The display portion 232 typically includes a plurality of display pixels so that information concerning current eyewear or training settings or conditions can be presented in a user's field of view. In some examples, the display portion includes a single pixel that can be strobed or otherwise actuated to indicate eyewear status. For example, a rapidly strobing display portion 232 can indicate a pattern rate or a duration of a training session.

The light sensor 214 is in communication with a sensor processor 238 that can provide an indication of, for example, ambient lighting in an environment in which the eyewear 202 is situated, or direct lighting received by the eyewear 202. Obscuration patterns, sequences, and intensities can be varied based on the indication. The processor 238 generally includes an amplifier or buffer that can receive an electrical signal from the light sensor 214 and provide an output signal indicative of light received. For example, an overall illumination level can be established so that, for example, a wearer's eyes receive a similar light flux regardless of ambient illumination conditions.

Differing obscuration patterns and sequences can be supplied to the left and right lenses. In some examples, vision from a single eye is to be trained, and only the corresponding lens is used. In other examples, the lenses are selected at random intervals to serve as distractions such as might be encountered due to, for example, fan motion, or other regular or irregular movements at a sporting event.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting.

Figure 3:
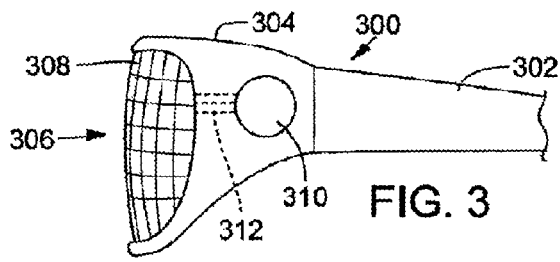
FIG. 3 illustrates vision training eyewear in accordance with embodiments of the present invention.

FIG. 3 illustrates representative vision training eyewear 300 that includes a temple piece 302, a frame front 304, and a lens 306. The lens 306 includes zones such as representative zone 308. A control switch 310 is provided and is electrically coupled to the lens zone with an interconnect 312 that is included in the frame front. The control switch 310 can be adapted to activate the zones or select patterns or pattern sequences. For example, the switch 310 can include a rotating portion that can select pattern strobe rate, and a push mechanism for turning the eyewear on and off.

Lenses for vision training eyewear can include a lens substrate, such as a lens blank of glass, polycarbonate, acrylic, or other suitable optical material. The substrate can be configured to define both a left and a right lens or separate substrates can be used for each. Substrates can be tinted or colored to control total transmittance and/or provide a predetermined spectral transmittance, or can be made of photochromic materials. A lens substrate typically has a posterior surface (facing the wearer) and an anterior surface (facing away from the wearer) in an as worn position. Curvatures and centers of curvature of one or both of these surfaces can be selected to provide a preferred optical correction, or to be substantially optically neutral. For convenience, a positive curvature is defined as a curvature whose center of radius is on a posterior side of a lens substrate in an as worn position. Curvatures of the surfaces typically are selected to be between about 0 diopter and +14 diopters.

Diopter, also sometimes referred to as dioptre, can be a measurement of curvature equal to the reciprocal of the radius of the curve measured in meters. For example, a circle with a radius of ½ meter (i.e., diameter of 1 meter) has a curvature of two diopters. Diopter can be defined in terms of radius or diameter where diameter is two times the radius. Consequently, as indicated previously, exemplary embodiments include a lens having a curvature between 0 and +14 diopters, which is equivalent to a lens having a curvature that is defined by a diameter up to and possibly greater than ⅐ meter (0.1428 meter) (i.e., radius possibly greater than 1/14 meters). However, it is understood that the curvature of the lens as a whole or portions of a lens may be defined by a diameter such as between 120 and 200 millimeters (i.e., 0.12 to 0.2 meters). In an additional exemplary embodiment, the curvature of a lens may also range between 130 and 180 millimeters in diameter. Or, in an additional embodiment, it is contemplated that the curvature of a lens ranges from 130 to 140 millimeters in diameter in at least portions of the lens.

Vision training lenses also include a zone-switchable optical modulator that can be conformed to or bonded to an anterior surface or a posterior surface of the lens substrate. Such optical modulators can be flexible for attachment to surfaces having optical curvatures of 4 diopters or more. Optical modulators can be bonded to both surfaces if desired. The modulator generally includes an optically active (i.e., switchable) area and an interconnection portion (typically at a perimeter) that is adapted to receive control signals and deliver the control signals to the switchable zones directly or to a zone driver decoder that establishes, for examples, appropriate row and column conductor signals for matrix addressing. Flexible liquid crystal-based modulators are convenient.

While frame-based eyewear can be convenient for general use and activity-specific training, activity-specific eyewear, visors, face shields, combat helmets, two-wheeler helmets, occupational helmets, emergency and protective helmets, sports helmets, or protective shields can be similarly configured. For examples, obscuration zones can be provided on a face shield adapted for a football, hockey, or lacrosse helmet or other head protector. Goggles and facemasks for racquet sports, lacrosse, and baseball can also be configured to include vision shield portions on which pluralities of switchable zones can be defined.

The examples include obscuration patterns or zones that block or partially block a portion of a field of view. However, other kinds of obscuration patterns and obscuration zones can be used. For example, light emitting zones can be provided so that a wearer's field of view is presented with regions of increased light emission that tend to obscure view. Such emission zones can be configured to provide temporally varying light emission, including spectrally varying light emission. If desired, such light emission can also be configured to have a spatially and/or temporally varying polarization. The zones can occupy substantially the entire area of a lens, or can be configured to occupy only a small portion of the lens area. For examples, lenses that include opaque light emission regions can be configured so that the lenses are largely transparent. Accordingly, light attenuating zones and/or light emissive zones can be provided.

Figure 4A:
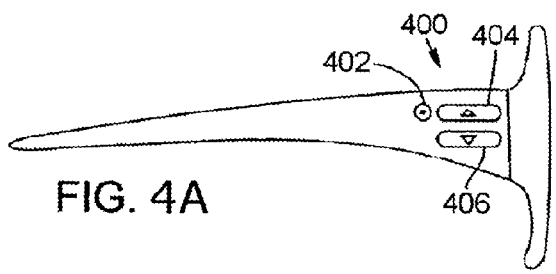
FIGS. 4A-4B illustrate a temple piece for vision training eyewear that includes controls for selecting a level of visual difficulty provided by the eyewear in accordance with embodiments of the present invention.

FIG. 4A illustrates a temple piece 400 for exemplary vision training eyewear. The temple piece 400 includes a power button 402 and level adjust buttons 404, 406 that can be used to decrease or increase the visual challenge (i.e., the level of difficulty) that the eyewear provides. These buttons are located on the temple piece 402 for convenient adjustment while in use. The power button 402 can be configured to initiate and terminate operation of the vision training eyewear. In addition, the power button 402 can be configured so that pressing the button can be used to toggle among strobing of a right lens only, strobing of a left lens only, or strobing of both lenses. The power button 402 can also be configured to sequence through a predetermined menu of zone patterns or sequences, but it can be more convenient to provide an additional selection button to facilitate these or other user adjustments. The level adjust button 404 can be configured so that pressing the level adjust button 404 increases a difficulty level until a maximum available difficulty level is reached at which point additional button presses may have no effect. Operation of the level adjust button 406 can be similar at a minimum difficulty level.

Figure 4B:
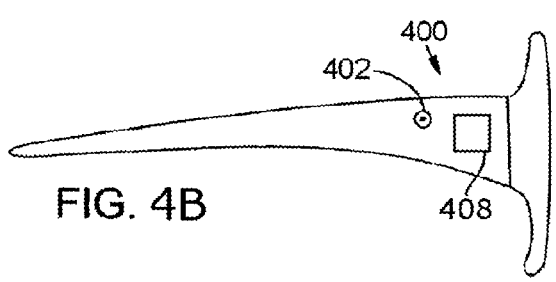

In another aspect, and as shown in FIG. 4B, the temple piece 400 includes a power button 402 and a cycling button 408. These buttons are located on the temple piece 400 for convenient adjustment while in use. The power button 402 can be configured to initiate and terminate operation of the vision training eyewear. For example, pressing the power button 402 once can initiate operation of the vision training eyewear for both the right eye and the left eye. Pressing the power button 402 again initiates vision training for just the right eye. Pressing the power button 402 yet again initiates vision training for just the left eye. Finally, pressing the power button 402 for the fourth time terminates the operation of the vision training eyewear. The cycling button 408 can be configured to adjust the difficulty level from a minimum difficulty level to a maximum difficulty level.

In an additional exemplary embodiment, a subsequent activation of a mode button that is currently set to an extreme (i.e., highest or lowest level) cycles to the next extreme (e.g., cycle of difficulty levels 1, 2, 3, 4, 5, 6, 7, 8, 1, 2, 3 . . . ). For example, if a difficulty level is currently set to a highest extreme (e.g., level 8), a subsequent activation (e.g., depressing, manipulation, wearer provided feedback) of a mode button causes the difficulty to switch to the lowest level of difficulty (e.g., level 1).

Additionally, it is contemplated that vision training eyewear include fewer or more controls (e.g., buttons). For example, when vision training eyewear is intended to be used solely for 3D viewing purposes, a difficulty selection control may not be utilized. In this example, the flicker rate may be controlled by an external controller (e.g., synchronization signal provided by a display device). Similarly, controls may be limited to a power (e.g., on/off) control and a mode control that cycles through difficulty levels or modes of operation (as discussed above). Therefore, it is contemplated that one or more controls may be implemented in various embodiments of the present invention.

Figure 5:
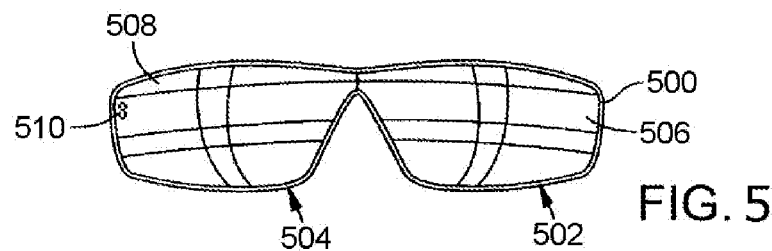
FIG. 5 illustrates left and right lenses that include a plurality of zones in accordance with embodiments of the present invention.

FIG. 5 illustrates an arrangement of zones in a left lens 502 and a right lens 504 that can be controlled with a temple piece such as that of FIG. 4. As shown in FIG. 5, the left lens 502 and the right lens 504 are formed as a unitary lens assembly 500, but can be provided separately as well. A display region 510 is also provided to permit communication of eyewear settings to the user. As shown in FIG. 5, a seven segment display is convenient. The lenses 502, 504 include representative zones 506, 508, respectively. The remaining zones are unlabeled in FIG. 5. In some examples, the zones provide variable light attenuation. While the zones can be controlled to be substantially clear, substantially opaque, or have intermediate values of light transmission, example operation of eyewear that includes the temple piece 402 and the lenses 502, 504 is described with zones that are referred to as configurable to be in a "clear" state or a "dark" state.

Figure 6:
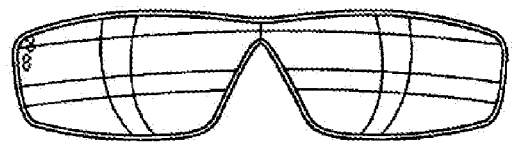
FIGS. 6-7 illustrate a clear state and a dark state, in phase, for the lenses of FIG. 5, in accordance with embodiments of the present invention.
Figure 7:
Figure 8:
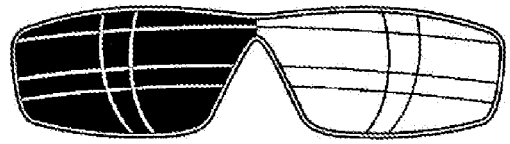
FIGS. 8-9 illustrate a clear state and a dark state, out of phase, for portions of the lens of FIG. 5 in accordance with embodiments of the present invention.
Figure 9:
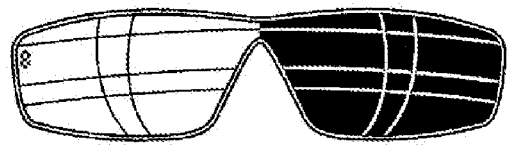

Operation of the lenses of FIG. 5 is illustrated in FIGS. 6, 7, 8, and 9. When the lenses are powered on using the power button 404, an initial or default difficulty level is displayed in the display region 510 and the lenses remain in the clear state. The default difficulty level can be an easiest level and assigned an indicator of "1" that is displayed when the lenses are powered on. After a brief interval (for example, 2-10 sec), the zones of the lenses 502, 504 begin to strobe at a rate associated with the initial difficulty level, and the display 510 can be switched off. Strobing of one or both lenses can be set as an initial mode of operation that can be controlled with the power button 404. Additional presses of the power button 404 cycle through selection of a left lens, a right lens, and power off. Typically, with the eyewear switched off, pressing the power button 404 initiates the eyewear with both a left and a right lens alternating between a clear state and a dark state. FIGS. 6 and 7 illustrate the eyewear during a clear state and a dark state, respectively, in which all zones are switched. Alternatively, the zones of only one lens can be switched as illustrated in FIGS. 8 and 9. Difficulty level can be adjusted at any time, and a new difficulty level displayed in the display region 510.

Difficulty levels may be changed by altering a duration of being in a dark state or by altering a duration of being in a clear state, or a combination of both. For example, a difficulty level may have a fixed duration of 0.1 sec, while dark state intervals and have durations that increase with increasing level of difficulty. For example, the most difficult level may provide a 0.9 second interval of obscuration during which the wearer's vision is obstructed. In an additional exemplary embodiment, a repetitive sequence of clear state/dark state intervals are provided and a clear state/dark state intervals for a representative 1 second time period are shown. Durations of dark state intervals for levels 1-8 are listed in the following table.

| Level | Dark State Duration (sec) |
| --- | --- |
| 1 (easiest) | 0.025 |
| 2 | 0.043 |
| 3 | 0.067 |
| 4 | 0.100 |
| 5 | 0.150 |
| 6 | 0.233 |
| 7 | 0.400 |
| 8 (hardest) | 0.900 |

Additional arrangements are contemplated for affecting a perceived level of difficulty by a wearer of vision training eyewear. For example, the duration of a dark state and the duration of a light state may be altered in combination or independently. For example, a one-to-one ratio may be maintained between a dark state and a light state while changing the duration used for the one-to-one ratio (e.g., 75 millisecond dark state and a 75 millisecond light state). Additionally, it is contemplated that a dark state maintains a fixed duration while the light state duration is altered to affect a perceived level of difficulty. Further, any combination of (1) fixed duration light state/variable duration dark state, (2) fixed duration light state/fixed duration dark state, and (3) variable duration light state/fixed duration dark state may be implemented in an exemplary embodiment of the present invention.

This arrangement of clear state/dark state intervals is an example, and other arrangements can be used, including those in which both clear state and dark state interval durations are varied, or a frequency at which clear state/dark state intervals are switched. At frequencies greater than about 10-20 Hz, alternating clear and dark levels tend to merge and can be perceived as gray. This merger occurs at different frequencies for central vision and peripheral vision, and peripheral vision tends to note flicker at higher frequencies. Durations of dark/light intervals can be selected based on such merger. Visual challenges can be more noticeable at rates at which flicker is observed, or at lower rates. It is understood that in certain embodiment, the merger of the clear and dark may be desirable, such as when viewing a video display presenting three-dimensional imagery, to be discussed in more detail hereinafter.

Levels of difficulty can also be associated with the pattern or sequence of zones that are controlled to be in a clear state or a dark state, and level adjustment is not limited to clear state/dark state interval durations. Level adjust buttons can be configured to alter obscuration patterns, sequences, and/or timings to select visual challenges.

Figure 10:
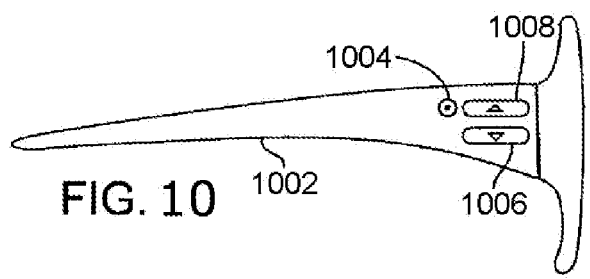
FIG. 10 illustrates a portion of a representative temple piece for vision training eyewear that includes controls for selection of rows and columns of zones in accordance with embodiments of the present invention.

In another example illustrated in FIG. 10, a temple piece 1000 is provided with a power switch 1002, a row selection switch 1004, and a column selection switch 1006. Repeated actuations of the switches 1004, 1006 permitting selection of different rows or columns of zones, respectively. Zone timing can be altered with repeat actuations of the power switch 1002.

The low power lens may have any amount of minus power, up to that for a concentric lens for a given base curvature. Low power lenses may, for example, have more minus power than −0.005 diopter, for example more than −0.01 or −0.02 diopter and particularly in the range of −0.01 to −0.12 diopter, for example −0.04 to −0.09 diopter. Such low power lenses achieve a number of advantages. The low power lenses have less taper, and can be thinner than zero power lenses. The reduction in taper produces a corresponding reduction in peripheral prism that would otherwise be induced by the excessively non-parallel surfaces of the plano lenses. Thinner lenses also provide better physical stability, binocular balance, improved optical quality, lower weight, more accurate depth perception and spatial judgment accuracy, and more uniform light transmission than plano lenses. A physiologic advantage of the low minus lens is that it better matches the accommodative posture of athletes and other persons engaged in highly visually demanding and/or stressful activities.

Patterns or sequences for a left eye and a right eye can be activated at different frequencies, amplitudes (different light transmissions), duty cycles (different relative on/off durations), and phases. Patterns need not be switched at a constant frequency but can be at chirped or other variable frequencies or can be switched at random intervals. While lens transmittance is varied in some examples, a transmitted light state of polarization can be varied as well. Such polarization modulation can be conveniently provided with zones defined by nematic liquid crystals. The lenses can also be tinted or neutral gray to statically control light transmission, or photochromic substrates can be used.

Eyewear and eyewear systems are conveniently configured to present predetermined patterns and pattern sequences at fixed or variable rates. Typically, a user or trainer can select additional patterns, pattern sequences, obscuration extents, variable or fixed pattern rates, pattern colors or color sequences, or other vision obscurations. These additional training selections can be selected using a personal computer or other computer system that is configured to present a range of customization options for selection based by the user or trainer using a keyboard or pointing device such as a mouse. After these additional training sequences are designed, the sequences can be stored in a memory and communicated to the eyewear system for storage at an eyewear controller that may or may not be integral with the eyewear. Customization and pattern selection can be based on sport-specific functions, specific training goals, wearer physiology (eye separation, orbit asymmetry) or otherwise configured.

Figure 11:
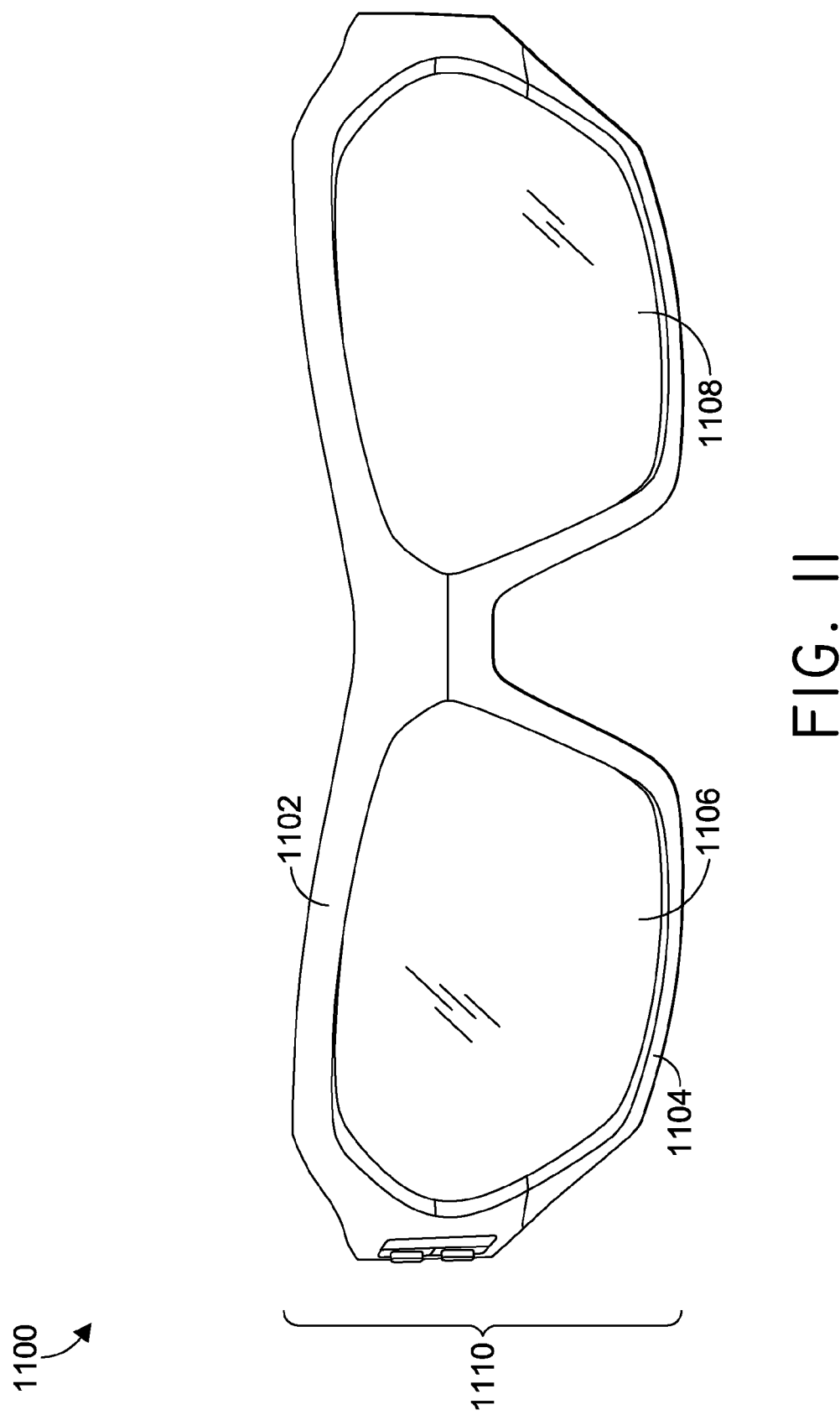
FIG. 11 illustrates curved eyewear in accordance with embodiments of the present invention.

Turning to FIG. 11, illustrates an exemplary curved eyewear 1100 in accordance with embodiments of the present invention. The curved eyewear 1100, as seen from a frontal perspective, includes a superior member 1102 and an inferior member 1104 that both comprise a portion of a frame. The frame is effective for maintaining a lens having two portions 1106 and 1108 in a curved orientation.

As discussed herein, a lens may include a substrate, one or more coating materials, or components, all of which work together to allow transmission of light or obscure the transmission of light as perceived by a wearer of the curved glasses. Additionally, as used herein, a lens may constitute a single portion effective for controlling light transmission perceived by a single eye. Further yet, as used herein, a lens may constitute a common member having two portions, where each portion of the common member is effective for controlling light transmission perceived by a unique eye of a wearer.

Returning to FIG. 11, the portion 1106 may, in an exemplary embodiment, be a separate member from the portion 1108. However, in an additional exemplary embodiment, the portion 1106 and the portion 1108 are a common member, but serving different portion of a wearer's visual spectrum (e.g., a common lens serving two different eyes).

In an exemplary embodiment, the superior member 1102 forces the portion 1106 to have a defined curve. For example, the portion 1106 may naturally be a flat substrate that lacks an appreciable curve. However, the superior member 1102 may guide the portion 1106 into a curved orientation and maintain the portion 1106 in that curved orientation. As will be discussed in detail hereinafter, the superior member 1102 may include a channel (not shown) that is adapted to receive a superior edge of the portion 1106. The channel may have a curve that is similar to or approximately the same as a desired curved orientation of the portion 1106 (or a lens in general).

Additionally, it is contemplated that a channel within the superior member 1102 is slightly smaller in diameter than the desired curve of a received lens, but the width of the curved channel is wider than the width of the received lens that is to be maintained within the channel. Further yet, it is contemplated that a channel within the superior member 1102 is slightly greater in diameter than the desired curved of a received lens, but with a width of the curved channel that varies with respect to the location in the curve. Both of these examples are contemplated in an effort to provide a receiving channel in which a lens having electrically variable spectral transmittance may be maintained in a curved orientation while not interfering with the ability of the lens to consistently, across a whole surface, vary light transmittance. As will be discussed in more detail below, adjusting the curve of a channel and the width of the channel prevents pinch points, which disrupt the electrically variable spectral transmittance of a lens near a pinch point.

Figure 12:
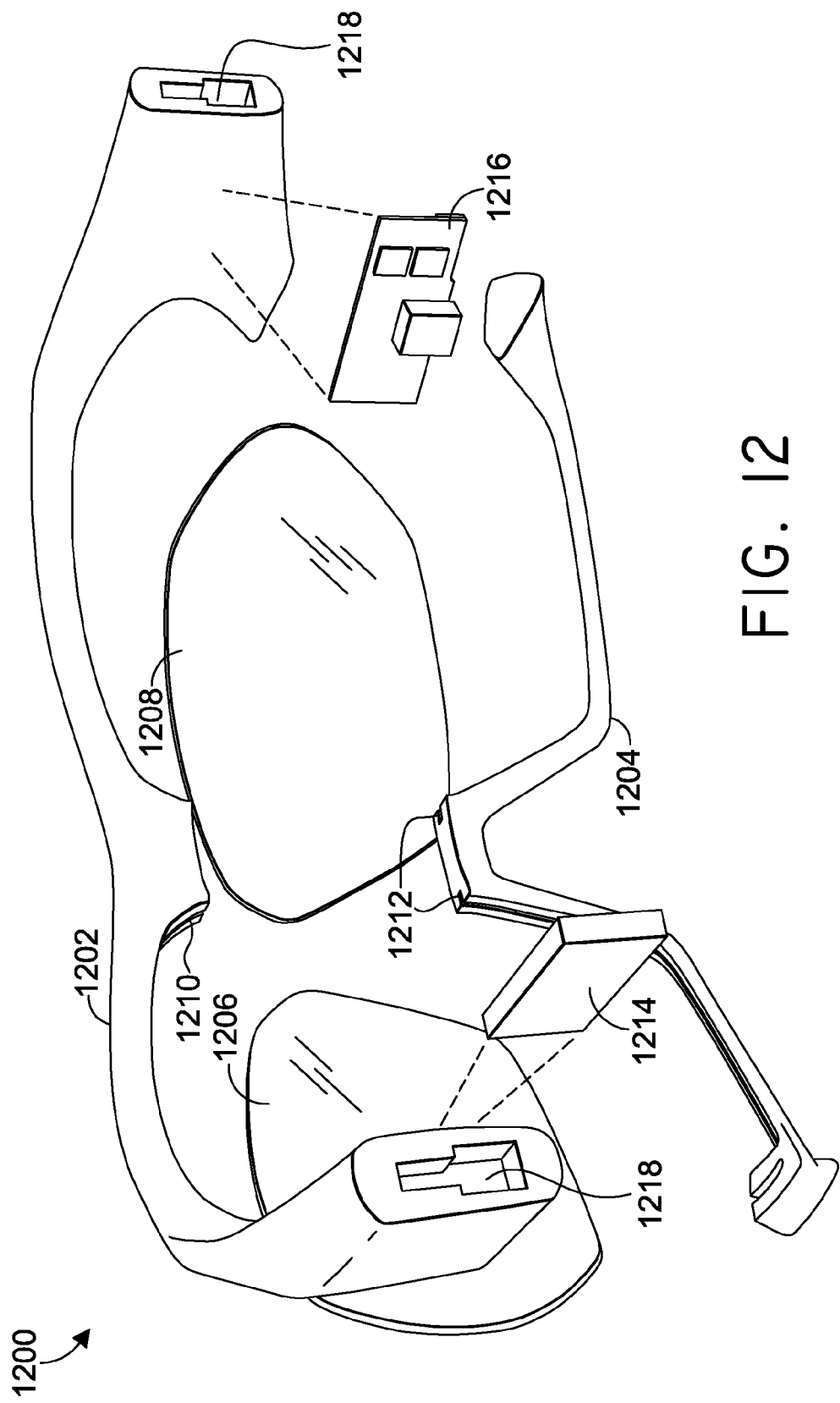
FIG. 12 illustrates curved eyewear from an exploded posterior perspective in accordance with embodiments of the present invention.

FIG. 12 illustrates an exemplary curved eyewear 1200 from an exploded posterior perspective in accordance with embodiments of the present invention. The curved eyewear 1200 is comprised of a superior member 1202, an inferior member 1204, a left lens portion 1206, a right lens portion 1208, a superior channel 1210, an inferior channel 1212, a power source 1214, a programmable control board (PCB) 1216, and maintaining member receiving slots 1218.

The superior member 1202 may be constructed from a shatter resistant polymer capable of withstanding an impact. For example, when the curved eyewear 1200 is used in an athletic activity (or any activity) that presents a possibility of an object (e.g., ball) contacting the curved eyewear 1200, the ability of the materials to resist breaking is beneficial for both the wearer's safety and the longevity of the curved eyewear 1200. Consequently, the right lens portion 1208 and the left lens portion 1206 may also be constructed from a shatter-resistant material, such as a polymer or other similarly characterized material.

In an exemplary embodiment, a curved lens is not made with glass. As will be appreciated, glass may shatter upon impact and potentially cause damage to a wearer's vision. Glass is also heavier and more prone to fogging. Therefore, in an exemplary embodiment of the present invention, a curved lens is not made from glass, but instead from a plastic material having characteristics (e.g., transparency) suitable for use as a lens. Further yet, in an exemplary embodiment, the lens is constructed from a malleable plastic material that is bendable and therefore able to be curved at ambient temperatures and with reasonable pressure. For example, a lens is constructed, in an exemplary embodiment, from a flat plastic substrate (i.e., physical material onto which electrically variable transmittance materials may be adhered) that, at room temperature, may be curved to form a curved lens. The plastic substrate in this example is then maintained in a curved orientation (e.g., position) by a typical force that may be exerted by a typical eyewear frame. However, it is contemplated that a lens may also be constructed of glass in an exemplary embodiment.

Figure 15:
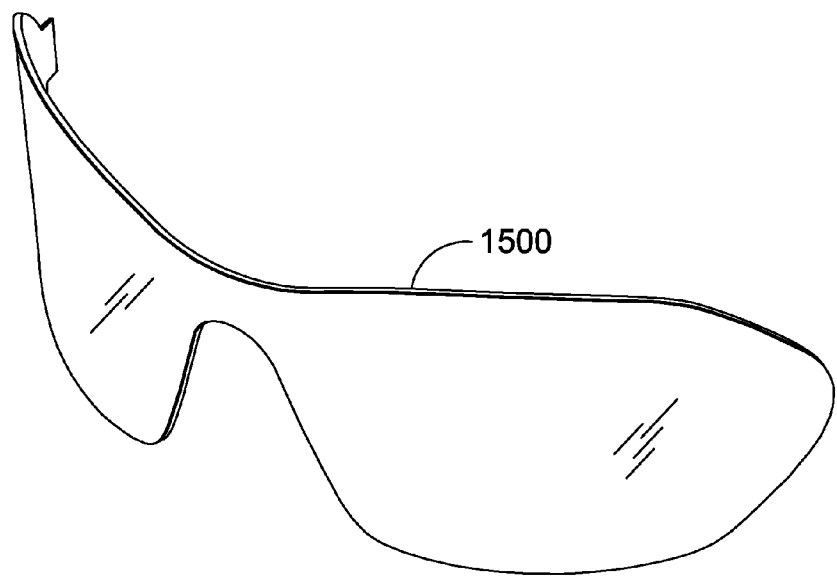
FIG. 15 illustrates a curved lens effective for manipulating perceived light by two eyes of a human wearer in accordance with an embodiment of the present invention.

The curved eyewear 1200 is depicted having two distinctly separate lens portions, the right lens portion 1208 and the left lens portion 1206. However, as previously discussed, it is contemplated that a single lens may be utilized in embodiments of the present invention, as depicted in FIG. 15 hereinafter. A lens portion, regardless if it is a single or part of a pair of lenses, may have a number of zones, as previously discussed and depicted with FIGS. 5-9. Therefore, in an example where a single lens serves both eyes of a wearer, because multiple zones may be included, light perceived by each of a wearer's eyes may be in phase or out of phase, or another combination of zone configurations with each other.

The superior member 1202 is a portion of a frame that maintains the left lens portion 1206 and the right lens portion 1208 in a position relative to a wearer's face and eyes. As is typical of an eyewear frame, the superior member 1202 is effective for maintaining the curved eyewear in a desired location relative to a wearer of the curved eyewear 1200. The curved eyewear 1200 incorporates both the superior member 1202 and the inferior member 1204, in combination, to maintain the left lens portion 1206 and the right lens portion 1208. However, in an exemplary embodiment, it is contemplated that a superior member, an inferior member, or neither (e.g., rimless) may be implemented with a curved lens(es).

The superior member 1202 includes the superior channel 1210. The superior channel 1210 is a recessed portion within the superior member 1202 that is adapted for receiving and maintaining an edge portion of a lens. As previously discussed, the width of the superior channel 1210 may coordinate with the width of an edge that will be received and maintained therein. Or, in an exemplary embodiment, the width of the channel 1210 is wider, at least along one or more sections, than the width of a lens that is to be maintained therein. The depth of the superior channel 1202, in an exemplary embodiment, is sufficiently deep to maintain a lens, while minimizing an amount of the lens that is recessed within the superior channel 1210. The superior channel 1210, in an exemplary embodiment, also provides a cavity in which one or more electrical leads are placed. The electrical leads may be used for controlling the electrically variable transmission state of a lens and/or for connecting the power source 1214 with the PCB 1216.

Similar to the superior channel 1210, the inferior channel 1212 is a recess in a frame member, such as the inferior member 1204, that is functional for receiving and maintaining one or more lenses. The curved eyewear 1200 is an exemplary embodiment of the present invention in which the left lens portion 1206 and the right lens portion 1208 are maintained in a curved orientation by both the superior channel 1210 and the inferior channel 1212. However, it is contemplated that a single channel is effective for maintaining a curved orientation for one or more lenses.

The PCB 1216 is a programmable computing board that includes a processor and computer readable storage media. In an exemplary embodiment, the PCB 1216 is an exemplary control system 204 as previously discussed with respect to FIG. 2. The PCB 1216 is functional for controlling one or more states of a lens. Examples of a state include a transparent state. A transparent state is a state of light transmission through a lens with minimal disruption by electrically variable spectral transmittance manipulation. Stated differently, an electrically variable spectral transmittance lens, when supplied power, may be in a "dark" state or a "light" state, depending on the inherent characteristics of the material relied upon to alter the spectral transmittance characteristics of the lens. A dark state is one that obscures light transmittance through the lens to a greater degree than when spectral transmittance is not reduced (e.g., power applied, power not applied). Similarly, a light state is one that does not additionally obscure light transmittance through the lens than when spectral transmittance is reduced (e.g., power applied, power not applied). Therefore, as used herein, a transparent state is a state that allows a greater percentage of spectral transmittance to occur than an obscured state. Similarly, as used herein, an obscured state is a state that allows a lesser percentage of spectral transmittance to occur than a transparent state. Consequently, a transparent state and an obscured state are relative terms to one another as used herein.

The PCB 1216, in an exemplary embodiment, is adapted to synchronize an out-of-phase flicker (e.g., strobe effect) between a transparent state and an obscured state for the left lens portion 1206 and the right lens portion 1208. The synchronization of the out-of-phase flicker is coordinated with a refresh rate of a display device. For example, a display device, such as a monitor, television, and/or a projector (and associate viewing surface), refresh a displayed image a particular number of times per unit of time. This is commonly measured in hertz, which are cycles per second.

In an exemplary embodiment of the present invention, curved eyewear are synchronized with a refresh rate of a display device. The synchronization allows one portion of the curved lens to be transparent while another portion of the curved lens is obscuring. The cycle from transparent to obscuring coordinates with the display device so that an image intended to be perceived by a right eye is displayed on the display device as the lens associated with the right eye of a wearer is transparent in state. Similarly, the cycle from transparent to obscure is coordinated so that when an image intended to be perceived by the left eye of a wearer is displayed on the display device, the lens associated with the left eye is transparent. Conversely, the lens associated with the eye that is not intended to perceive a given image at a particular time is obscured.

For example, a television that has a refresh rate of 240 Hz (240 images per second are displayed) may be synchronized with curved eyewear so that a left lens is transparent 120 times per second and obscured the other 120 times per second. Similarly, the 120 per second that the left lens is obscured, the right lens is transparent and vice versa. Therefore, the television may show 120 images per second intended for the left eye to perceive and an alternating 120 images per second intended for the right eye to perceive. This process of synchronizing two lens portions out of phase with each other and a television refresh rate allows for three-dimensional (3D) viewing experience of the content displayed by the television.

Advantages of curved eyewear having a curved lens when viewing 3D include allowing a wearer of the curved eyewear to utilize a greater range of peripheral vision in a 3D viewing experience. For example, when viewing a large display device from relatively close distance (e.g., front row of a movie theater) a portion of the displayed content is outside of the wearer's central vision that is served by standard flat lens 3D viewing glasses. Further, in an IMAX type viewing environment that intends to take advantage of a viewer's peripheral vision, non-wrapping 3D glasses fail to provide the necessary augmentation to the wearer's vision. Consequently, a curved lens that wraps around a wearer's field of vision provides an enhanced and complete 3D viewing experience.

Curved eyewear, in an exemplary embodiment, includes a receiver component (not shown). The receiver component receives a synchronization signal from a display device in order to synchronize the out-of-phase cycle of two lens portions of the curved eyewear with the refresh rate of the display device. For example, an infrared receiver that receives an infrared signal from the display device or an associated content source. Additional examples of a receiver component include a radio frequency ("RF") receiver. For example, BLUETOOTH (IEEE Standard 802.15), is a short range RF specification that is contemplated as being utilized in embodiment of the present invention.

In addition to aiding in the synchronization of curved eyewear and a display device, the receiving module may also (or in the alternative) function to receive one or more remote control signals to control the curved eyewear. For example, functionality that is adjustable directly from the curved eyewear may also be adjusted remotely. For example, the flicker rate of the electrically adjustable spectral transmittance of a curved lens may be adjusted (e.g., frequency, duration, intensity, on/off) by a remote control that communicates with the curved eyewear by way of the receiving module.

For example, an athletic trainer may adjust the intensity level (e.g., change a duration of obscured state or transparent state of one or more lens portions) using a remote control while an athlete is training with the curved eyewear. Consequently, the athlete may be running a receiving route with the curved eyewear at an easy intensity level, and after the athlete initially identifies an incoming ball, the trainer may increase the intensity level of the curved eyewear to enhance the training experience.

The receiving module, in an exemplary embodiment, is coupled, either directly or indirectly, to the PCB 1216. As a result, processing of received signals may be accomplished in whole or in part by one of the receiving module or the PCB1216.

Returning to FIG. 12, the superior member 1202 may have two maintaining member receiving slots 1218. The maintaining member receiving slots 1218 are functional for receiving a maintaining member, such as a strap. For example, when the curved eyewear 1200 is used in an athletic or moving activity, a strap allows the curved eyewear to be maintained in a desired position relative to the face of a wearer. In an additional exemplary embodiment, the maintaining member received at the maintaining member receiving slots 1218 includes a temple, such as the temple piece 302 previously illustrated with respect to FIG. 3.

Figure 13:
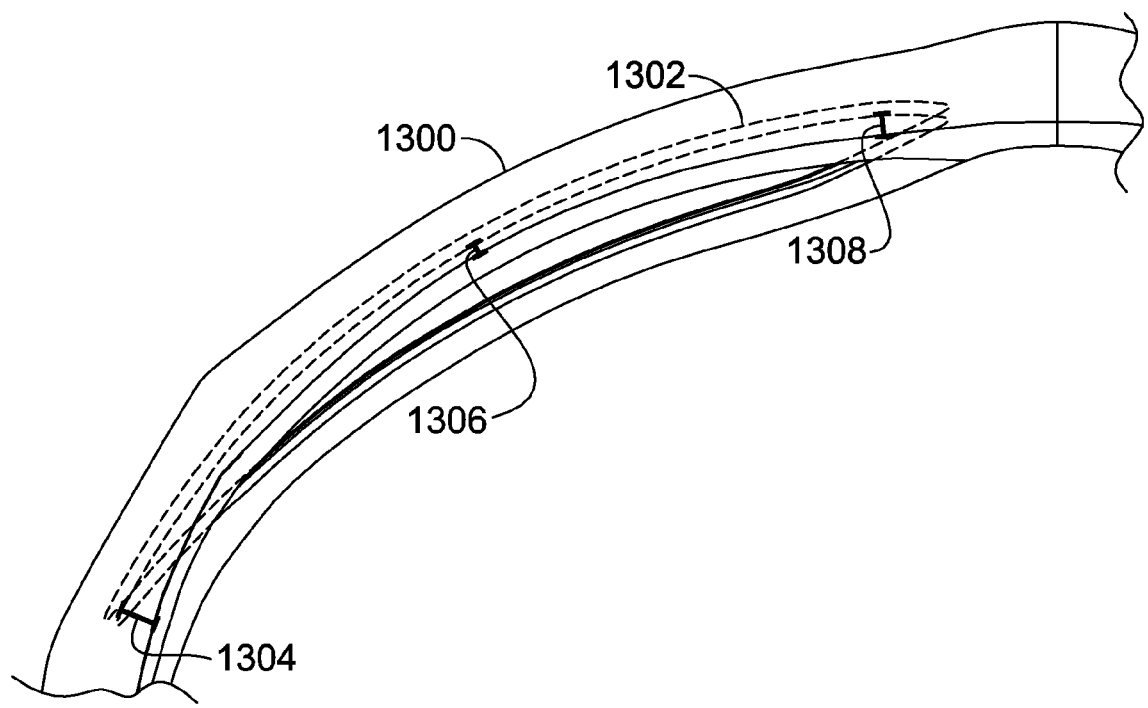
FIG. 13 illustrates a portion of a curved eyewear frame having a curved channel in accordance with embodiments of the present invention.

FIG. 13 depicts a portion of a curved eyewear frame 1300 having a curved channel 1302 in accordance with an embodiment of the present invention. As previously discussed, a channel for receiving and maintaining a curved lens within a curved eyewear may not have the same curve diameter as the frame. For example, in an embodiment, in order to increase an amount of "wrap," which is an amount of extension around a wearer's head away from a medial line, the frame may have a smaller diameter curve than a curved lens associated with the frame. In this example, in an effort to reduce the amount of strain placed on a curved lens while maximizing an amount of wrap provided by the curved eyewear as a whole, the curved lens diameter is get greater than the curved frame diameter. An analogy of this concept for illustration purposes comes from a race driver's path when taking a corner on a race track. In this analogy, the driver reduces the amount of turning within a corner by starting on the outside of the corner cutting to the inside of the corner near the apex and exiting the corner toward the outside edge of the track.

The curved channel 1302 follows the analogy provided above such that the diameter of the curved channel 1302 is greater than the general diameter of the frame 1300. For example, the distance between the "inside" edge of the frame 1300 and the curved channel 1302 changes from a first distance 1304, to a smaller distance 1306 near the apex of the curve. Finally, the distance between the inside edge of the frame 1300 and the curved channel 1302 increases from the distance 1306 to a distance 1308 at the "exit" of the curve. Therefore, a desired amount of peripheral field of vision for a wearer of the curved eyewear is achieved while reducing the curve of the actual lens within the curved eyewear. It is understood that in an exemplary embodiment, the diameter of a curved lens may be similar to that of a frame in which it is maintained. Further, while FIG. 13 illustrates a curved channel 1302 that accommodates a lens that services only one eye, a curved channel may extend along a frame to similarly accommodate a lens that services both eyes.

Figure 14:
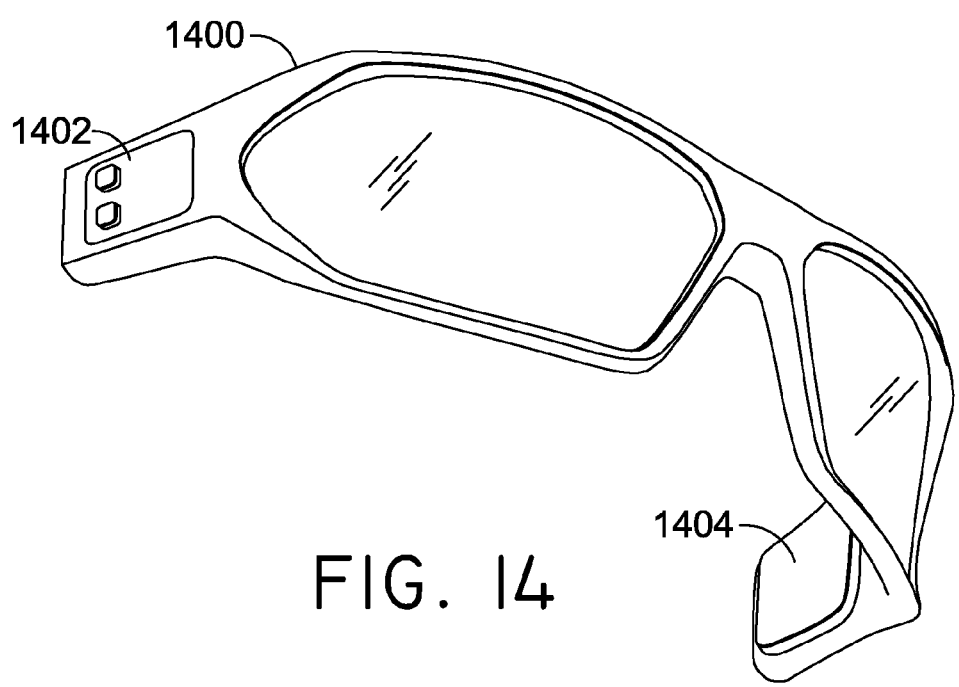
FIG. 14 illustrates a front perspective view of a curved eyewear in accordance with embodiments of the present application.

FIG. 14 depicts a front perspective view of a curved eyewear 1400 in accordance with embodiments of the present application. The curved eyewear 1400 is suitable for providing a wrap effect around a wearer's field of vision. Consequently, the curved eyewear 1400 are functional for allowing a wearer to have electrically switchable spectral transmittance that affects light perceived in peripheral fields of view.

Unlike typical flat lenses placed in a curved frame, eye lash contact by a wearer of the curved eyewear may be reduced. For example, when a flat lens is angled within a curved frame to provide the appearance, but not the benefits, of a curved lens and frame solution, the wearer may contact the uncurved, but angled, lens with his or her eyelash, particularly with lateral gazing. In an effort to force a non-curved lens in a curved frame to provide peripheral field of view electrically switchable spectral transmittance, the lens is angled so a medial edge is pushed away from a wearer's face to allow a lateral edge of the lens to extend as posterior as possible in an attempt to cover a portion of the peripheral field of view. However, this angling of the lens causes the lens to come closer in proximity to the eye, and therefore eyelashes, of a wearer. When utilizing curved eyewear having electrically switchable spectral transmittance, the wearer does not desire for the distracting and interfering contact of eyelashes with the lens. Therefore, a curved lens avoids the severity of eyelash contact realized with a flat lens.

Returning to FIG. 14, a control portion 1402 for controlling functionality of the curved eyewear (e.g., electrically variable spectral transmittance) is illustrated on a right temple of the curved eyewear 1400. The control portion 1402, in an exemplary embodiment, is similar to the level adjust buttons 404 and 406 previously discussed with respect to FIG. 4. The curved eyewear 1400 also includes a power supply 1404. A previously discussed, the power supply 1404 may include a battery or other replaceable or rechargeable power supply. In an exemplary embodiment, the power supply 1404 is recharged through a Universal Serial Bus (USB) connection (not shown) associated with the curved eyewear 1400. For example, in addition to updating computer readable instructions for a PCB of the curved eyewear 1400, a USB connection may also be utilized to charge the power supply 1404.

FIG. 15 depicts a curved lens 1500 effective for manipulating perceived light by two eyes of a human wearer in accordance with an embodiment of the present invention. The curved lens 1500 is a unitary substrate to which an electrically variable spectral transmitting material is coupled. For example, an LCD material may be incorporated within, thereon, or otherwise positioned relative to a polymer substrate having shatter-resistant characteristics that are better than glass. The curved lens 1500 is effective to manipulate light perceived by both a left eye and a right of a wearer. However, it is understood that, as previously discussed, one or more zones (e.g., portions) of electrically variable spectral transmittance are contemplated as being implemented on the curved lens 1500 to allow for localized manipulation of perceived light.

Figure 16:
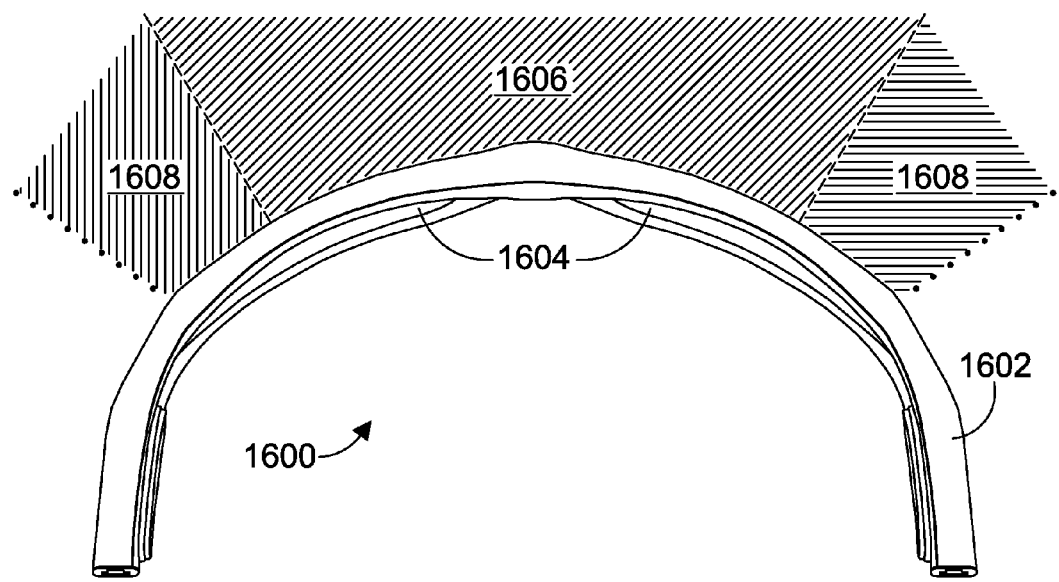
FIG. 16 illustrates a top view of a curved eyewear in accordance with embodiments of the present invention.

FIG. 16 depicts a top view of a curved eyewear 1600 in accordance with an embodiment of the present invention. The curved eyewear includes a curved frame 1602 and a curved lens 1604.

An exemplary illustration of a field of view provided by a flat lens is limited to the exemplary central field of view 1606. However, by providing the curve lens 1604 that wraps around a wearer, the field of view is increased to include the peripheral field of view 1608. Therefore, it is desirable for athletic vision training and 3D applications to increase a field of view to include the peripheral field of view 1608 in addition to the central field of view 1606.

Figure 17:
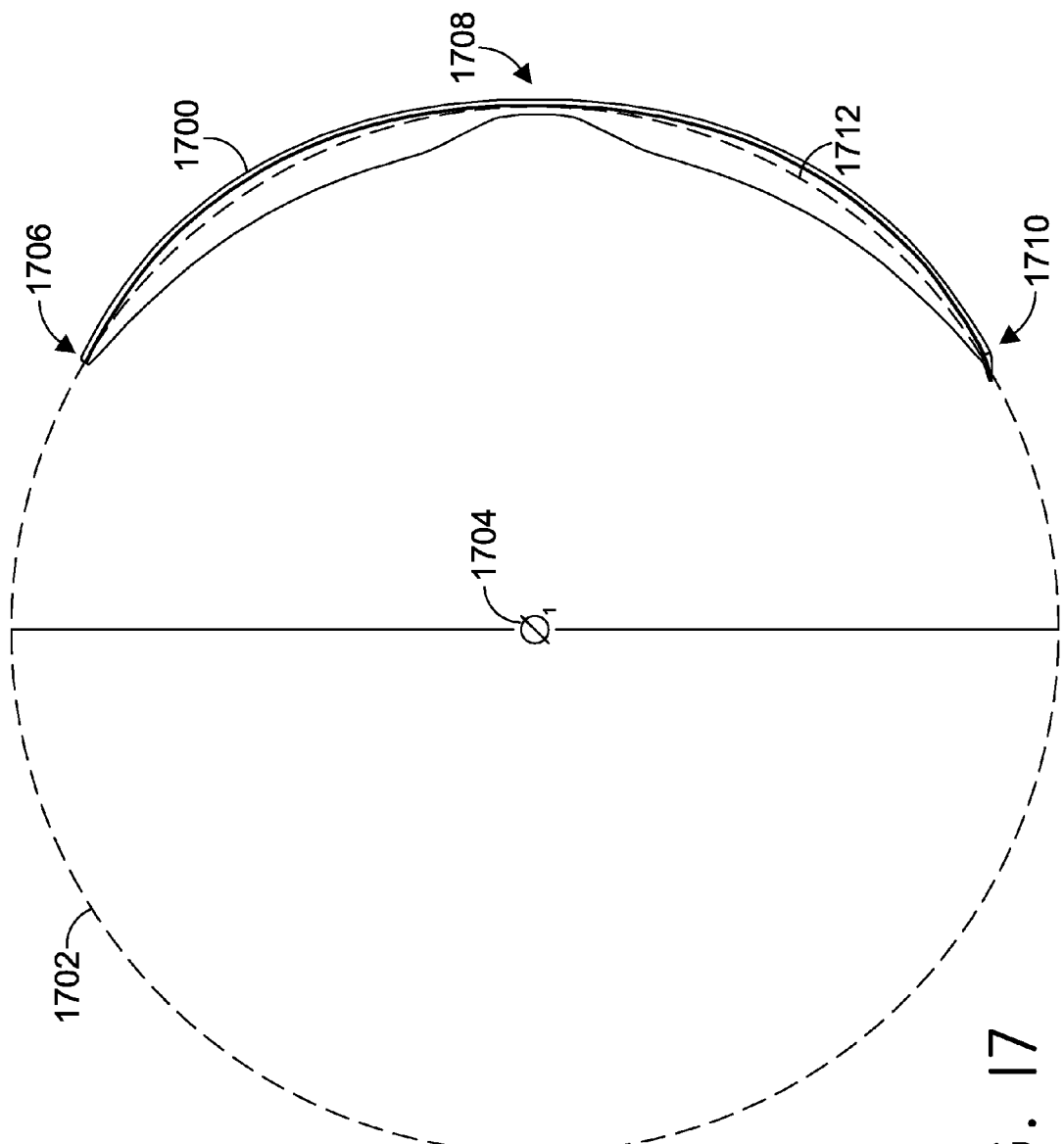
FIG. 17 illustrates an exemplary curved lens defined by a curve in accordance with embodiments of the present invention.

FIG. 17 depicts an exemplary curved lens 1700 in accordance with embodiment of the present invention. A curve 1702 is depicted along the general curve of the lens 1700. The curve 1702 has a diameter (Ø) 1704. The diameter 1704 of the curve 1702 defines a curved orientation of the curved lens 1700, where the curved orientation of the lens 1700 has a diameter of 1704. However, as is illustrated at positions 1706-1712, the curved lens 1700 does not adhere to a perfect circle defined by the curve 1702, but instead, the curved orientation of the curved lens 1700 is defined as a whole by the curve 1702.

For example, the curved lens 1700 actually intersects the illustrated curve 1702 at points 1706 (a left temple region), 1708 (a bridge region), and 1710 (a right temple region). However, the curved lens 1700 diverges, for example, at point 1712 from the curve 1702. The divergence of the curved lens 1700 is sometime referred to herein as an approximate curve as it is not consistently defined by a particular diameter, but instead as a whole is defined by a diameter. As previously discussed, the curvature of the curved lens 1700 may diverge to provide additional clearance from a wearer's eyelashes and/or to reduce stress on the curved lens 1706 to minimize negative effects to the electrically switchable characteristics of the curved lens 1700.

The diameter 1704 is between 120 millimeters and 200 millimeters in an exemplary embodiment. It is contemplated that the diameter is greater than or less than this range in other embodiments. In yet other embodiments, the diameter 1704 is 130 millimeters to 180 millimeters. An exemplary embodiment includes a curved lens with a curved orientation approximately defined by a curve having a diameter of 175 millimeters, which may also be expressed as 11.42 diopters. In yet another exemplary embodiment, as will be discussed in more detail hereinafter, a curved orientation may be defined by a curve having a diameter between 130 and 140 millimeters. For example, a curved lens, in an exemplary embodiment, has a curved orientation defined by an approximate curve having a diameter of 135 millimeters, which may also be expressed as 14.81 diopters.

Figure 18:
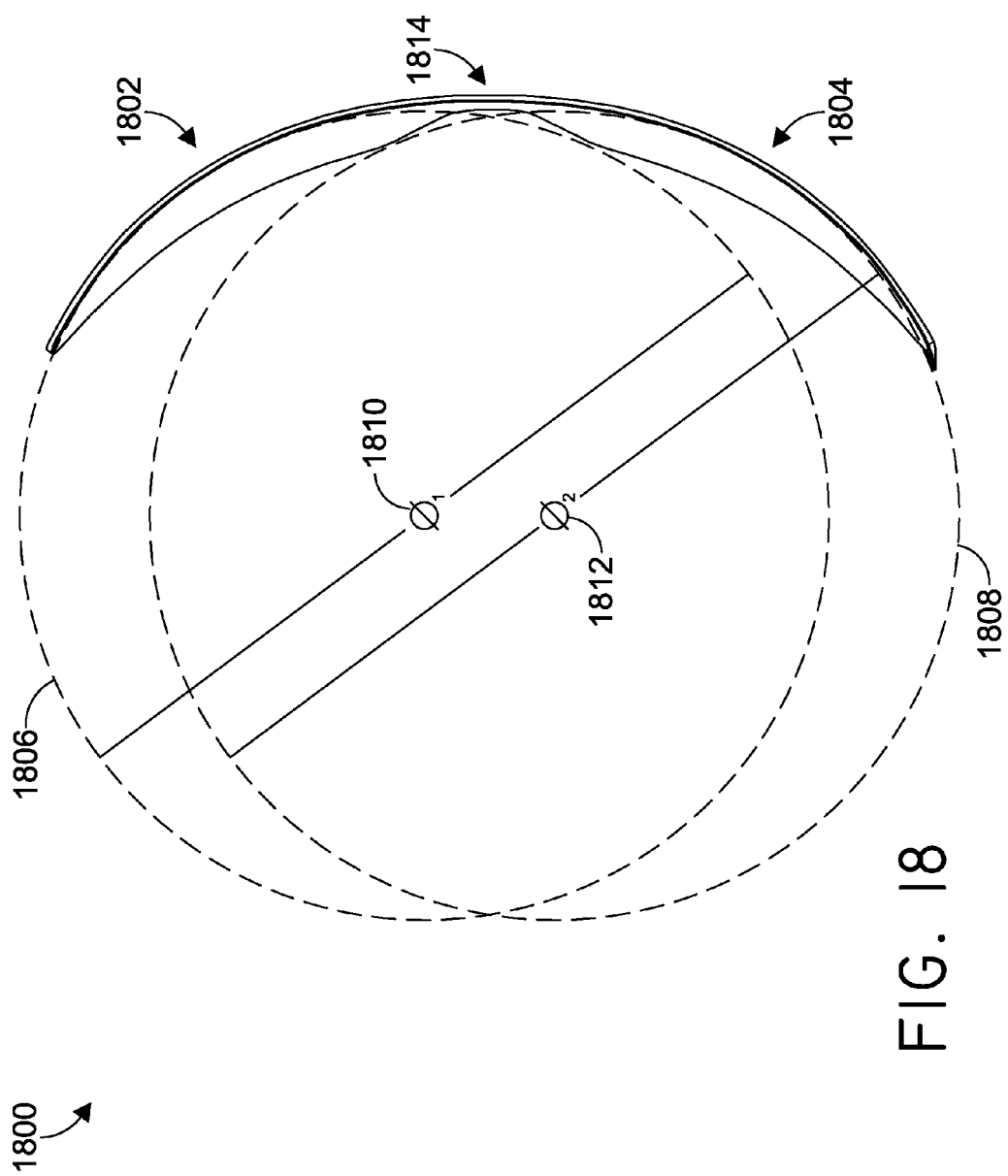
FIG. 18 illustrates an exemplary curved lens defined by another set of curves in accordance with embodiments of the present invention.

FIG. 18 depicts an exemplary curved lens 1800 in accordance with an embodiment of the present invention. The curved lens 1800 includes a left portion 1802, a right portion 1804 and a bridge portion 1814. A previously discussed with respect to FIG. 17, a curved lens may be defined, in part, by an approximate curve; however, in an exemplary embodiment, the curved lens 1800 is defined by a curve of a particular portion (e.g., left portion 1802, right portion 1804). Consequently, a curve 1806 is depicted along the general curve of the left portion 1802. The curve 1806 has a diameter ($\emptyset_1$) 1810. The diameter 1810 of the curve 1806, in an embodiment, defines a curved orientation of the curved lens 1800 as a whole, where a portion of the curved orientation of the curved lens 1800 has a diameter of 1810. Similarly, a curve 1808 is depicted along the general curve of the right portion 1804. The curve 1808 has a diameter ($\emptyset_2$) 1812. The diameter 1812 of the curve 1808, in an embodiment, also may define a curved orientation of the curved lens 1800 as a whole, where a portion of the curved orientation of the curved lens 1800 has a diameter of 1812.

The bridge portion 1814 may have less of a curved orientation (i.e., a greater diameter curve defining the curved orientation) than the left portion 1802 and the right portion 1804. Therefore, defining the curved orientation of the curved lens 1800, as a whole, is done by utilizing a diameter of a portion of the curved lens 1800. In this example, the curved lens 1800 is defined by a first curve (curve 1806) and/or a second curve (curve 1808) having respective diameters $\emptyset_1$ 1810 and $\emptyset_2$ 1812. In an exemplary embodiment, the diameters $\emptyset_1$ 1810 and $\emptyset_2$ 1812 are between 130 and 140 millimeters.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. The features, components, functions, and other material disclosed with respect to curved eyewear may be implemented with other aspects of vision training discussed herein.

Adjustable Vision Training and Testing

Figure 19:
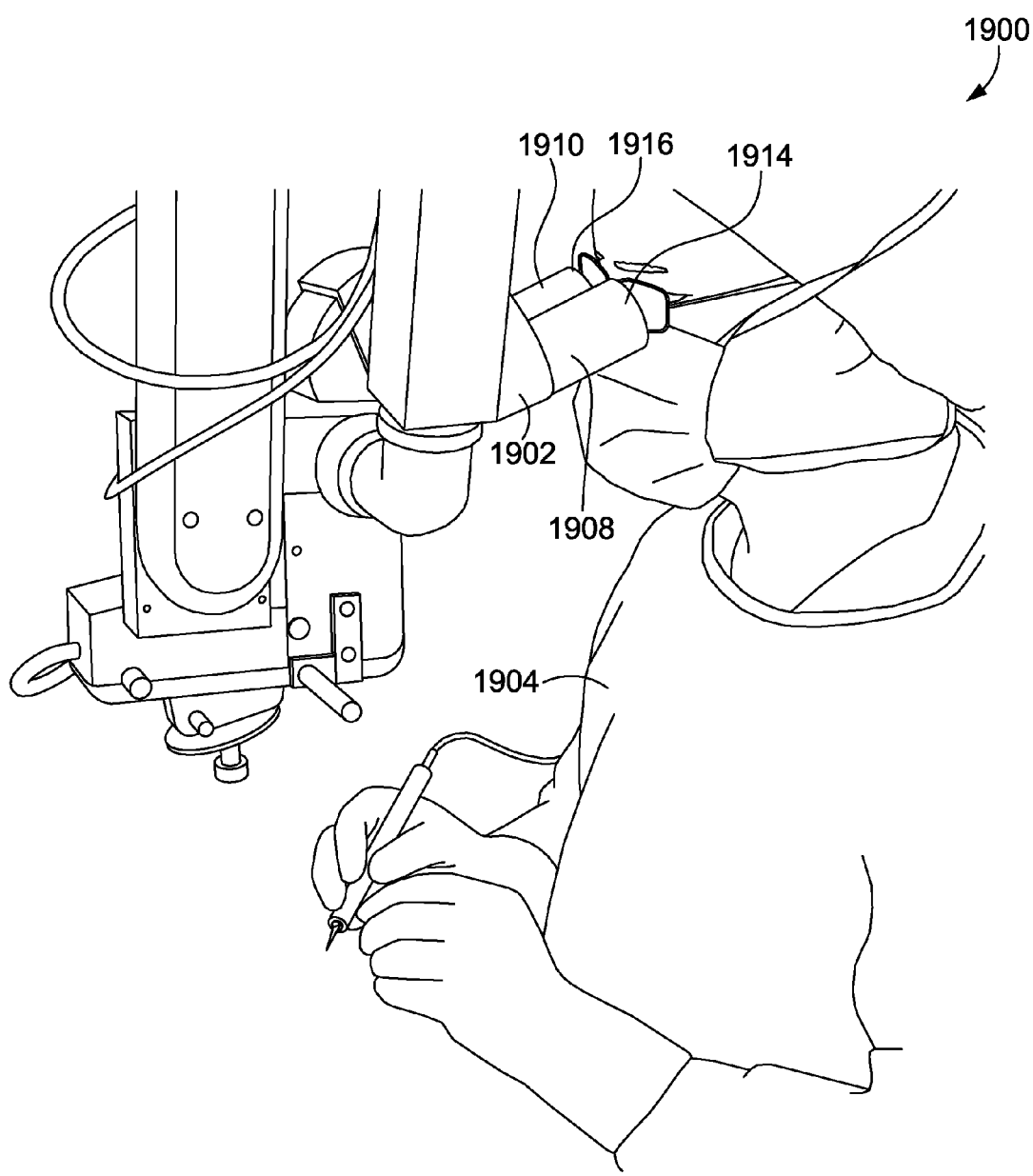
FIG. 19 illustrates a vision training system utilizing a display device in accordance with an embodiment of the present invention.

FIG. 19 illustrates a representative example of a vision training system 1900 utilizing a display device 1902 in accordance with an exemplary aspect. Display device 1902 may be situated so that users 1904 can position themselves in front of display device 1902. Display device 1902 comprises, but is not limited to, monitors, including computer monitors and television monitors, microscopes, including operating microscopes, trainer boxes, monocular viewing devices, binocular viewing devices, and the like. Vision training system 1900 may comprise one display device 1902 or multiple display devices 1902. By way of example, and not by limitation, display device 1902 may comprise a first display device 1908 with a first display area 1914, and a second display device 1910 with a second display area 1916. In one example of the invention, display device 1902 may be situated so that it is within the field of vision of user 1904, where field of vision comprises a user's central vision and/or peripheral vision. In yet another aspect, as shown in FIG. 19, display device 1902 may be situated so that it is immediately in front of the eyes of user 1904.

As explained more fully below, display device 1902 displays dynamic content with an adjustable flicker rate to provide visual training to user 1904. Further, first display device 1908 with first display area 1914 may be configured to display a first flicker rate, while second display device 1910 with second display area 1916 may be configured to display a second flicker rate. A vision training system in accordance with FIG. 19 may be suitable for use in professions that require users to discriminate between fine nuances. Such professions may comprise medical laboratory personnel, pathologists, radiologists, surgeons, pilots, astronauts, screeners, research scientists, and such. By way of illustrative example, a pathologist frequently makes use of a laboratory microscope to visually discriminate between different cell types in a tissue specimen for purposes of providing a diagnosis. The vision training system 1900 as illustrated in FIG. 19, which allows for independent vision training of both the right eye and the left eye, may be an ideal system to improve the visual performance of the pathologist. For example, first display device 1908 may be obscured while second display device 1910 may provide dynamic content having a perceived flicker rate. Alternatively, first display device 1908 may provide dynamic content having a perceived flicker rate of one frequency, while second display device 1910 may provide dynamic content having a perceived flicker rate of a second frequency.

Figure 20:
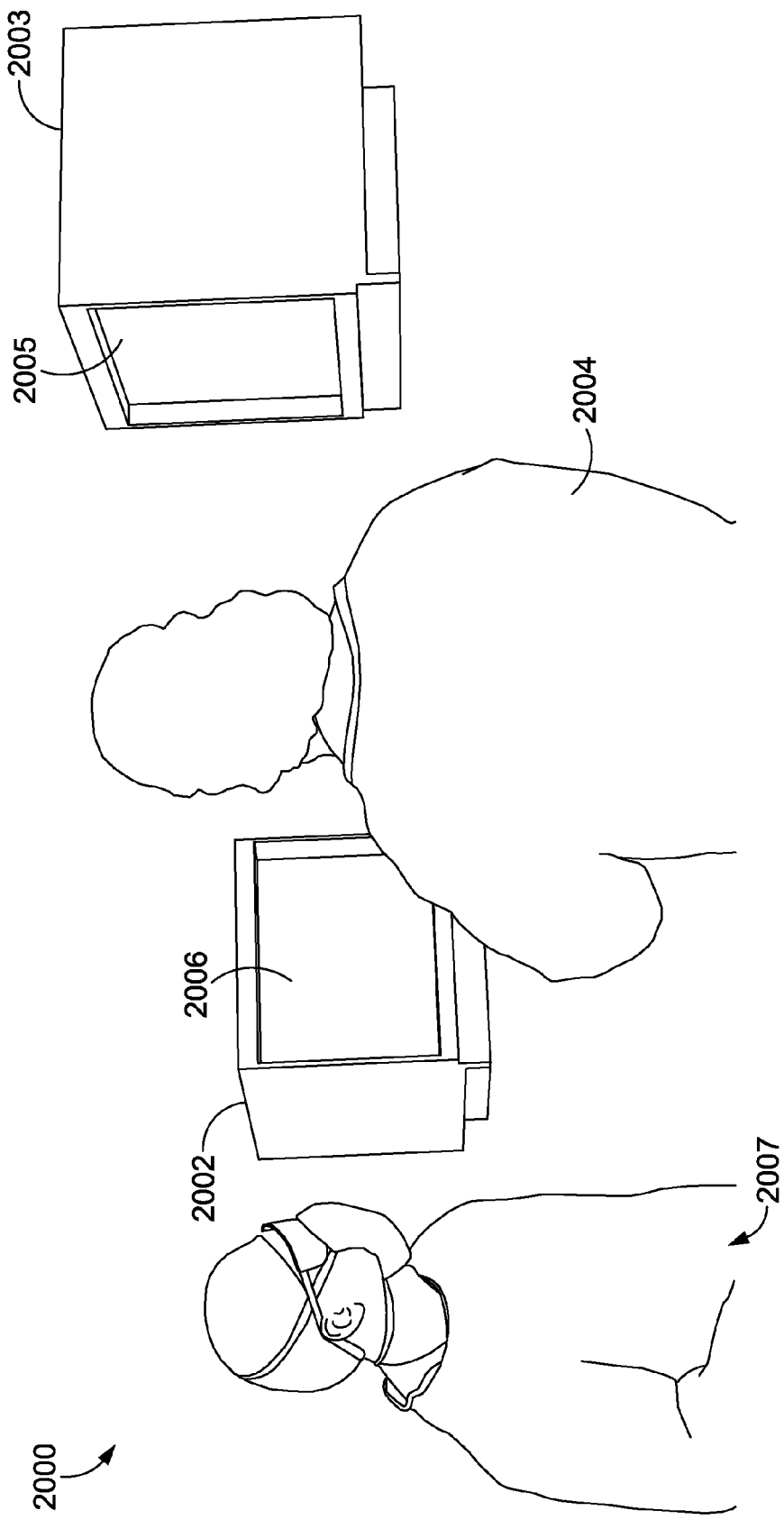
FIG. 20 illustrates a vision training system utilizing a display device in accordance with an embodiment of the present invention.

FIG. 20 illustrates another representative example of a vision training system 2000 utilizing a display device 2002 in accordance with an exemplary aspect. With respect to FIG. 20, one or more display areas 2006 may be associated with display device 2002. The one or more display areas 2006 may be configured to simultaneously display dynamic content in the form of a flicker rate to a user 2004. The use of one or more display areas 2006 allows multiple users 2004 access to the vision training system simultaneously. By way of illustrative example, vision training system 2000 may be particularly suited for surgeons who perform laparoscopic surgery. Laparoscopic surgery requires surgeon(s) to view a display device(s) while manipulating the laparoscopic instruments used in the surgery. For example, a first user 2004 may view dynamic content as presented by display device 2002 having a display area 2006, and a second user 2007 may view the same or different content on a second display device 2003 having a display area 2005. The display device 2002 and the display device 2003 may utilize in-phase, out-of-phase, similar frequencies, different frequencies, and/or similar or different duty cycles from one another. A display device with multiple display areas as just discussed would allow vision training of a team of surgeons to occur simultaneously, saving both time and money.

Figure 21:
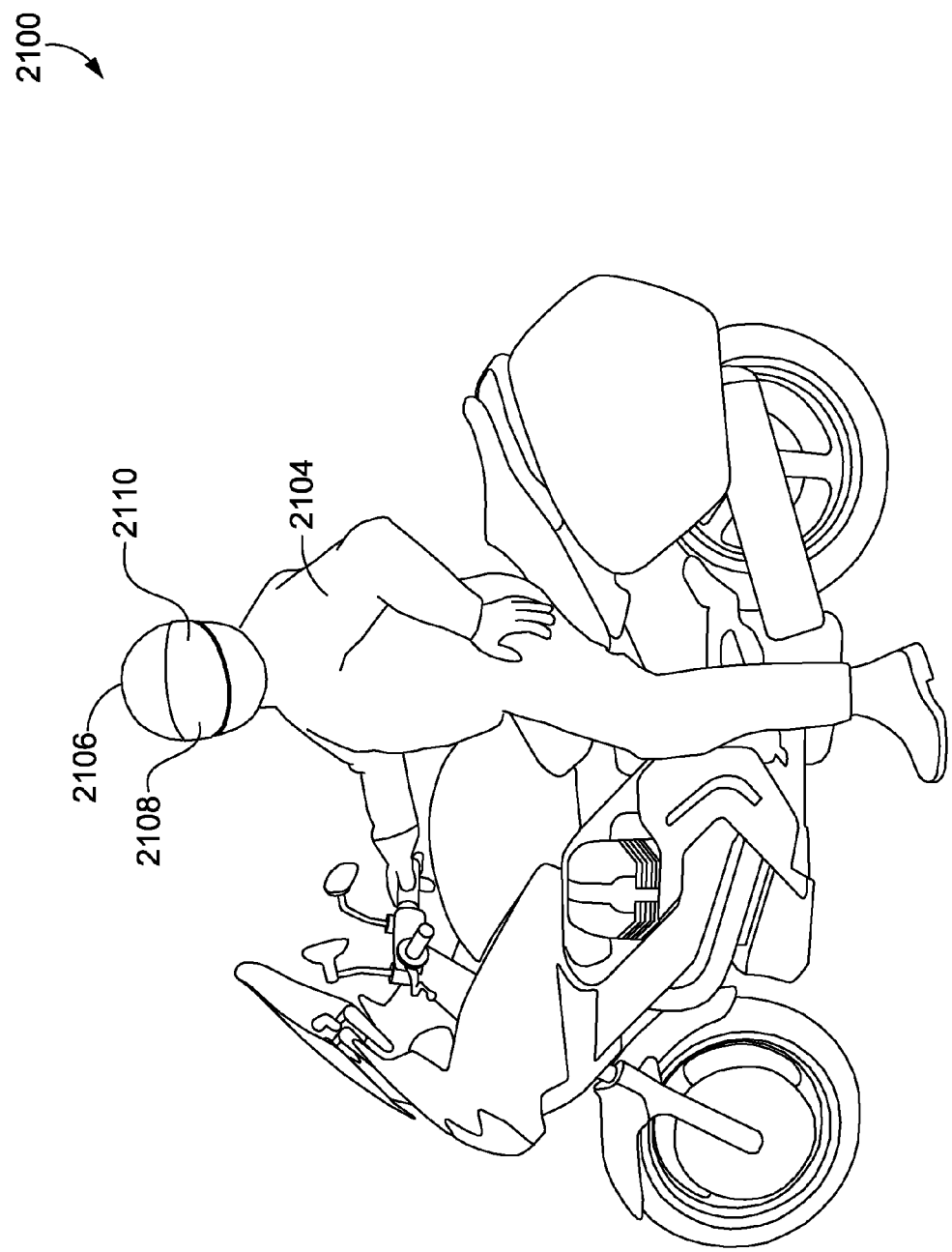
FIG. 21 illustrates a vision training system utilizing a first display area and a second display area in accordance with an embodiment of the present invention.

FIG. 21 illustrates yet another representative example of a vision training system 2100 utilizing a first display area 2108, and a second display area 2110 in accordance with the present invention. As will be outlined more fully below, vision training system 2100 may comprise a retaining device 2106 that is configured to retain first display area 2108, and second display area 2110 at a position relative to a user 2104. By way of example, and not by limitation, vision training system 2100 may comprise sport helmets, combat helmets, two-wheeler helmets, occupational helmets, emergency and protective helmets, goggles, eye shields, glasses, and other types of eyewear. The use of first display area 2108 and second display area 2110 allows two distinct flicker rates to be presented to user 2104. By way of illustrative example, vision training system 2100 may comprise a motorcycle helmet. Motorcycle riders are often in situations where their right eye will pick up different visual inputs than their left eye. For example, a car may be passing a motorcycle rider on his right side, while another car may be passing a motorcycle rider on his left side. The use of first display area 2108 and second display area 2110 allows for independent training of the right eye and the left eye by, for example, having first display area 2108 display a first flicker rate and having second display area 2110 display a second flicker rate that has a different frequency than first flicker rate.

As used with respect to aspects of the invention, dynamic content may comprise real-time or live streaming visual information, visual information that was captured at an earlier point in time and displayed to a user at a later point in time, animations, video games, displayed indicia, and the like. Also, as used with respect to aspects of the invention, flicker may be defined as a presentation state in which a visual output is provided to a user, and a non-presentation state in which no visual output is provided to the user. The period of time to cycle through a presentation state and a non-presentation state may be known as a flicker rate. As explained more fully below, the flicker rate may be set at a frequency that allows the user to perceive the presentation state/non-presentation state as a strobe-like effect. A variety of different technologies may be available to generate the presentation state/non-presentation state. Technologies may comprise cathode ray tubes (CRT) systems, plasma screens, liquid crystal display (LCD) systems, rear projection systems, light emitting diode (LED) systems, organic light emitting diode (OLED) systems, and such.

Figure 22:
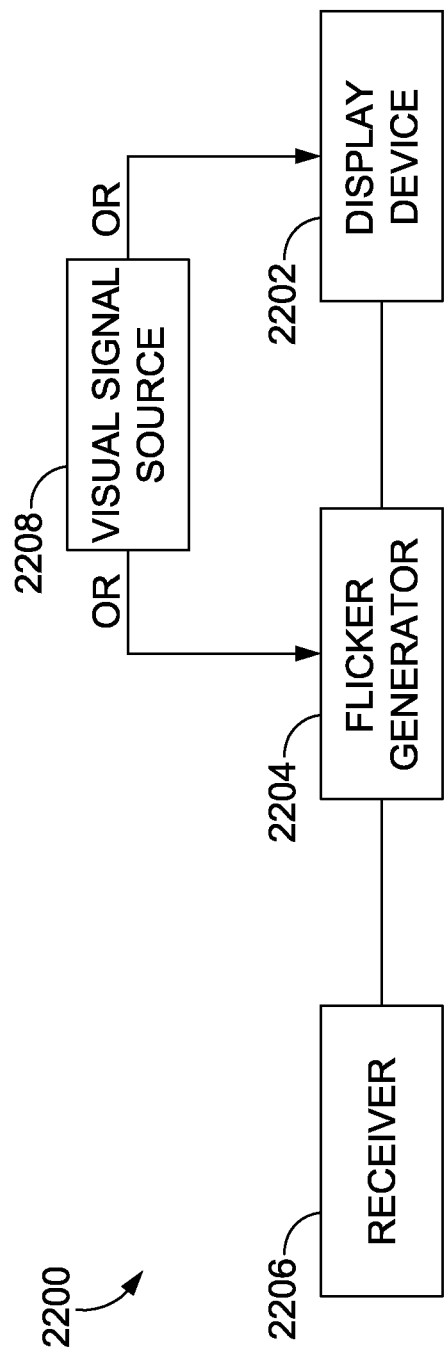
FIG. 22 illustrates a schematic of a vision training system utilizing a display device in accordance with an embodiment of the present invention.

FIG. 22 illustrates a vision training system 2200 comprising a display device 2202, a flicker generator 2204, a receiver 2206, and a visual signal source 2208. Visual signal source 2208 may be configured to provide a visual signal in the form of dynamic content to flicker generator 2204, or, alternatively, to display device 2202. In another aspect, visual signal source 2208 may be configured to provide a visual signal in the form of dynamic content with gaps in time or space to display device 2202. The gaps in time or space produce a flicker rate of a given frequency.

Display device 2202 may be configured to display dynamic content to provide visual training to a user of display device 2202. In one aspect, display device 2202 may be the display device 1902 discussed with reference to FIG. 19, and display device 2002 as discussed with reference to FIG. 20. The dynamic content may be presented with a flicker rate between 1 Hz and 30 Hz or, alternatively, with a flicker rate between 1 Hz and 5 Hz. In one aspect, display device 2202 may generate a flicker rate by periodically obscuring the dynamic content provided by visual signal source 2208. Or, as mentioned above, visual signal source 2208 may provide dynamic content with a flicker rate of a given frequency which then may be displayed by display device 2002. Alternatively, dynamic content presented with a flicker rate may be received from the flicker generator 2204 as explained in more depth below.

Continuing, in one example, display device 2202 may comprise one display area configured to display a flicker rate. In another aspect, display device 2202 may comprise one display area configured to display one flicker rate, but an obscuration pattern may be applied to a portion of the display area at a second flicker rate. Alternatively, in an additional aspect, display device 2202 may comprise one or more display areas where the one or more display areas may be configured to display a flicker rate. For example, display device 2202 may have a first display area configured to display a first flicker rate and a second display area configured to display a second flicker rate. In addition, display device 2202 may comprise one or more display devices as exemplified in FIG. 19.

In turn, flicker generator 2204 may be configured to adjust the flicker rate of the dynamic content, provided by visual signal source 2208, according to a duty cycle. An associated cycle may comprise a presentation state of a first duration and a non-presentation state of a second duration to produce a flicker rate between 1 Hz and 30 Hz. At frequencies greater than about 10-20 Hz, alternating presentation states and non-presentation states tend to merge and can be perceived as diminished light intensity. This merger occurs at different frequencies for central vision and peripheral vision, as peripheral vision tends to perceive flicker at higher frequencies. Durations of presentation/non-presentation states can be selected based on such merger. Visual challenges may be more noticeable at rates at which flicker is observed.

In one aspect, the flicker rate may be less than 1 Hz. Flicker rates of less than 1 Hz may be used in training athletes involved with static sports or slow-moving sports. Such sports may include billiards, chess, and golf (e.g., reading the green in golf). Such a low flicker rate would require athletes to fill in information between presentation states which, in turn, promotes short-term memory retention. By way of illustrative example, a presentation state may occur every ten seconds. Initially, the presentation state may be of a long duration and provide a substantial amount of information to a user. As the training session progresses, the time duration of the presentation states may decrease so that smaller amounts of information are provided to the user. This, in turn, forces the user to rely on his or her short-term memory to fill in the information gaps.

Flicker generator 2204 may be configured to determine pre-established flicker rates for use. In addition, flicker rates may be modified or adapted in response to input commands or other user inputs received via receiver 2206. For example, the flicker rate may be set at a high rate (e.g. greater than about 20 Hz) so that the flicker is noticed by the user primarily as a reduced transmitted light intensity in an exemplary display technology. Alternatively, the flicker rate may be set to a rate at which the user notices the interval between the presentation state and the non-presentation state. Typically rates less than about 5 Hz are associated with noticeable flicker, although this may vary according to the visual characteristics of the individual user. A flicker rate may vary from a high rate to a low rate so that the user experiences increased visual demand at low rates and less visual demand at high rates. Such variable frequency drive may be referred to as a "chirped" drive.

Figure 23:
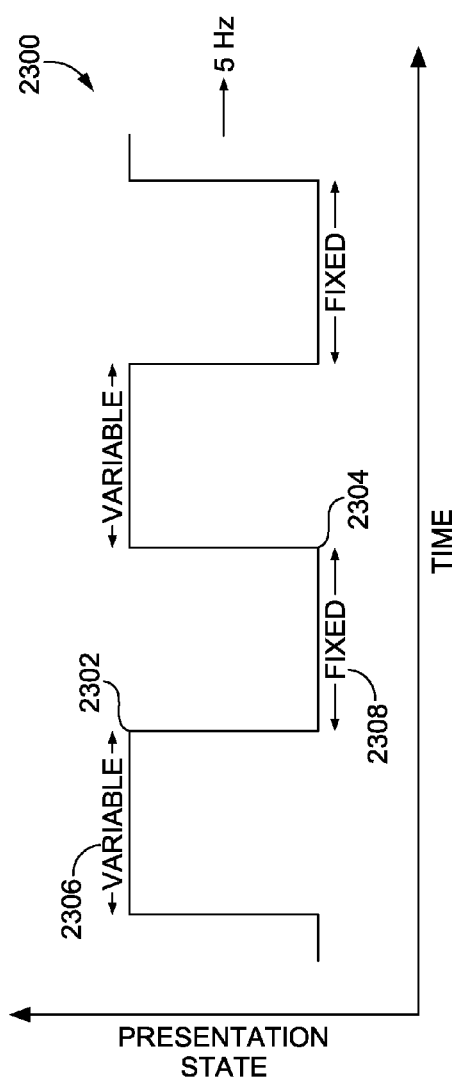
Figure 24:
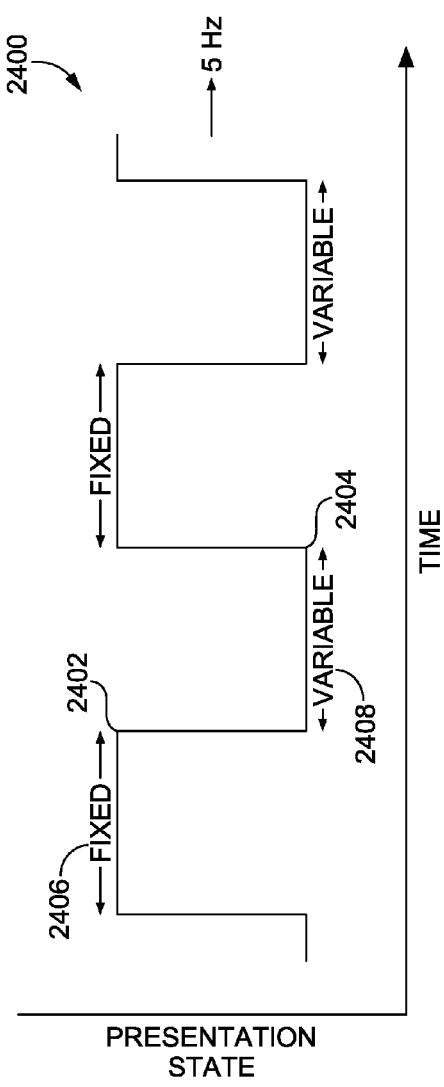

The level of difficulty of vision training system 2200 may be changed by altering the duration of the presentation state (e.g. duty cycle of the presentation state), or by altering the duration of the non-presentation state (e.g. duty cycle of the non-presentation state). FIG. 23 is an illustrative example of a cycle 2300. The cycle 2300 may comprise a presentation state 2302 of variable duration 2306, and a non-presentation state 2304 of a fixed duration 2308 to produce a flicker rate of 5 Hz for example. FIG. 24 is an illustrative example of yet another cycle 2400 in accordance with an aspect of the invention. The cycle 2400 may comprise a presentation state 2402 of fixed duration 2406, and a non-presentation state 2404 of variable duration 2408 to produce a flicker rate of 5 Hz for example. Further, FIG. 25 is an illustrative example of another cycle 2500 in accordance with an additional aspect of the invention. The cycle 2500 may comprise a presentation state 2502 of a fixed duration 2506, and a non-presentation state 2504 of fixed duration 2508 to produce a flicker rate between 1 Hz and 30 Hz. In one example of the invention, flicker generator 2204 may be configured to adjust the first flicker rate associated with the first display area independently of the second flicker rate associated with the second display area. One example of durations of presentation state/non-presentation state (e.g., first state/second state) for difficulty levels 1-8 is listed in the following table with level 1 contemplated as being the easiest and level 8 contemplated as being the most difficult:

| Level | First State (Sec.) | Second State (Sec.) | Frequency (Hz) |
| --- | --- | --- | --- |
| 1 | 0.067 | 0.067 | 7.5 |
| 2 | 0.1 | 0.100 | 5 |
| 3 | 0.1 | 0.150 | 4 |
| 4 | 0.1 | 0.233 | 3 |
| 5 | 0.1 | 0.344 | 2.25 |
| 6 | 0.1 | 0.471 | 1.75 |
| 7 | 0.1 | 0.650 | 1.33 |
| 8 | 0.1 | 0.900 | 1 |

Further, it is contemplated that additional aspects may include a variety of additional levels. For example, two additional exemplary level tables are provided herein below. It is contemplated that a first state may represent a presentation state and a second state may represent a non-presentation state. However, it is also contemplated that the first state and the second state may represent a variety of alternative states.

| Level | First State (Sec.) | Second State (Sec.) | Frequency (Hz) |
| --- | --- | --- | --- |
| 1 | 0.1 | 0.025 | 8 |
| 2 | 0.1 | 0.043 | 7 |
| 3 | 0.1 | 0.067 | 6 |
| 4 | 0.1 | 0.100 | 5 |

-continued

| Level | First State (Sec.) | Second State (Sec.) | Frequency (Hz) |
|---|---|---|---|
| 5 | 0.1 | 0.150 | 4 |
| 6 | 0.1 | 0.233 | 3 |
| 7 | 0.1 | 0.400 | 2 |
| 8 | 0.1 | 0.900 | 1 |

| Level | First State (Sec.) | Second State (Sec.) | Frequency (Hz) |
|---|---|---|---|
| 1 | 0.1 | 0.067 | 6 |
| 2 | 0.1 | 0.100 | 5 |
| 3 | 0.1 | 0.150 | 4 |
| 4 | 0.1 | 0.233 | 3 |
| 5 | 0.1 | 0.344 | 2.25 |
| 6 | 0.1 | 0.471 | 1.75 |
| 7 | 0.1 | 0.650 | 1.333 |
| 8 | 0.1 | 0.900 | 1 |

Additionally, returning to FIG. 22, the vision training system 2200 also comprises a receiver 2206. Receiver 2206 is configured to receive a flicker-rate-adjustment indication, where the flicker-rate-adjustment indication is useable by flicker generator 2204 to adjust the flicker rate of the dynamic content as displayed by display device 2202. Receiver 2206 may be either directly coupled to display device 2202 or remotely coupled to display device 2202. In one example of the invention, receiver 2206 is configured to receive a first flicker-rate-adjustment for the first display area and a second flicker-rate-adjustment for the second display area. Receiver 2204 may have one or more user controls such as knob, sliders, push buttons, or other input devices. As well, if receiver 2206 is remotely coupled to display device 2202 it may communicate with display device 2202 via the use of radio frequency signals, infrared signals, or the like.

Figure 27:
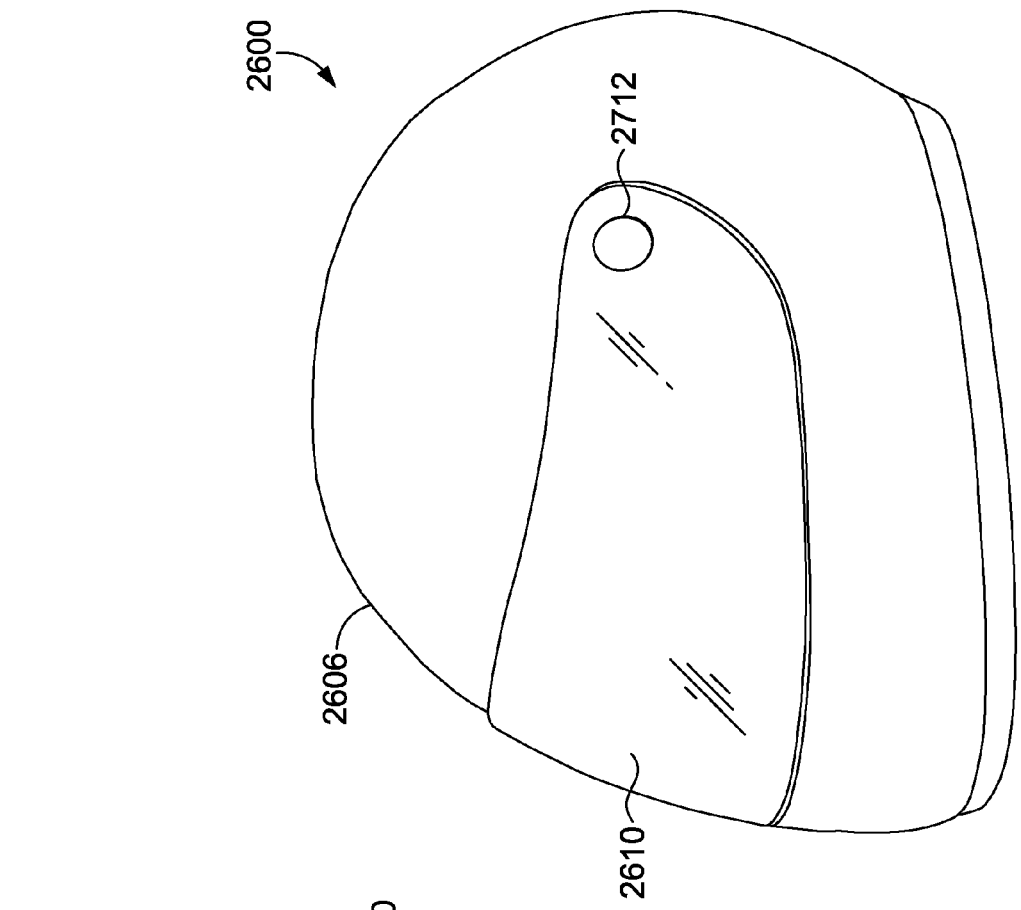
FIGS. 26-27 illustrate a vision training system utilizing a retaining device, a first display area and a second display area in accordance with an embodiment of the present invention.
Figure 26:
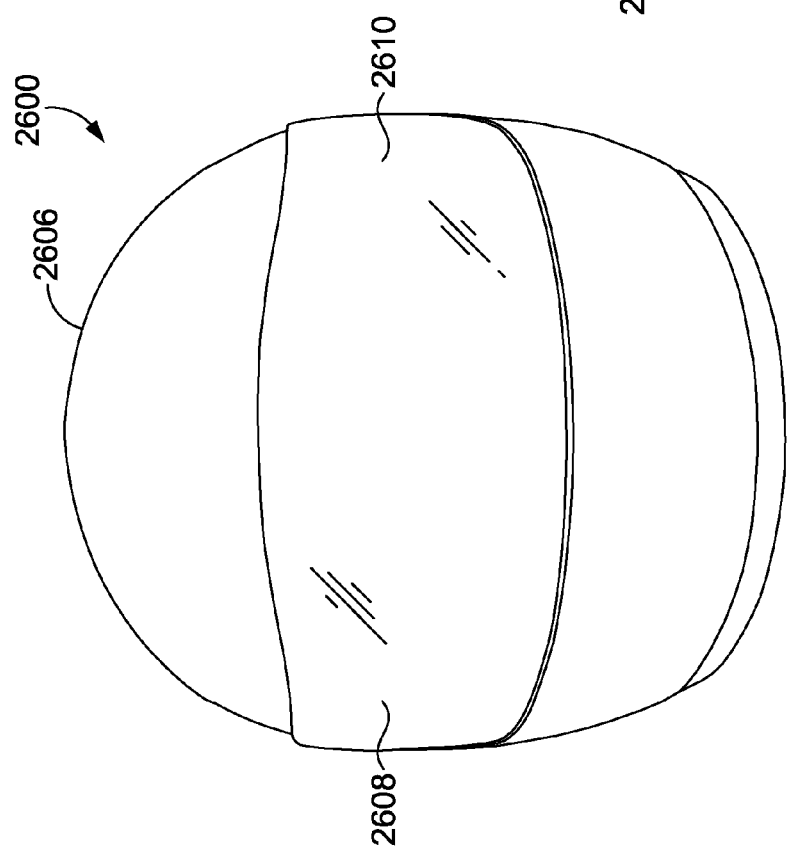

FIGS. 26 and 27 illustrate a vision training system 2600 utilizing a first display area 2608 and a second display area 2610. For example, first display area 2608 may be first display area 2108 in FIG. 21. Likewise, second display area 2610 may be second display area 2110 of FIG. 21. First display area 2608 may be electrically switchable from a first visual output to a second visual output to produce a first flicker rate. Vision training system 2600 also comprises a second display area 2610 that is electrically switchable from a third visual output to a fourth visual output to produce a second flicker rate. First, second, third, and fourth visual outputs are configured to be visually perceived by a user. The first visual output and the third visual output may comprise a presentation state, while the second visual output and the fourth visual output may comprise a non-presentation state. A display driver 2712 may be associated with first display area 2608, and second display area 2610. For example, display driver 2712 in vision training system 2600 could be utilized by the representative example shown in FIG. 21. In addition, vision training system 2600 also comprises a retaining device 2606 configured to retain first display area 2608, and second display area 2610 at a position relative to a user. For example, the retaining device 2606, in an exemplary aspect, is the retaining device 2106 in FIG. 21. In an example of the invention, retaining device 2606 may be positioned so that first display area 2608, and second display area 2610 are within 12 inches of the eyes of the user. This distance corresponds generally to the distance of a face shield from the eyes of a user wearing a helmet.

First display area 2608, and second display area 2210 may be comprised of a shatter-resistant substrate and electrically switchable optical materials. The substrate may comprise glass, polycarbonate, acrylic, or other suitable material. The substrate may be configured to define both first display area 2608 and second display area 2610 or separate substrates can be used for each. First display area 2608 and second display area 2610 may be tinted or colored to control total transmittance and/or provide a predetermined spectral transmittance, or can be made of photochromic materials. Electrically switchable optical materials configured to create the first, second, third, and fourth visual outputs may comprise polymer dispersed liquid crystals, nematic liquid crystals, or cholesteric liquid crystals.

Display driver 2712 may be associated with first display area 2608, and second display area 2610 and may control the first flicker rate produced from the cycling between the first visual output and the second visual output of first display area 2608. In addition, display driver 2712 may control the second flicker rate produced from the cycling between the third visual output and the fourth visual output of second display area 2610. Display driver 2712 may control the first flicker rate and the second flicker rate between 3 Hz and 40 Hz. In another example of the invention, display driver 2712 may be adapted to control electrically switching the first flicker rate independently of the second flicker rate. Additionally, display driver 2712 may be directly coupled to retaining device 2606, or remotely coupled to retaining device 2606 through, for example, a wireless connection.

In yet another example, vision training system 2600 may comprise a receiver component (not shown). The receiver component may receive an indication from a user to adjust the first flicker rate and the second flicker rate and communicate this flicker-rate-adjustment indication to display driver 2712. The receiver component may be directly coupled to retaining device 2606, or remotely coupled to retaining device 2606. If the receiver component is remotely coupled to retaining device 2606, it may communicate with display driver 2712 via the use of infrared signal or radio frequency. For example, a trainer may adjust the flicker (e.g., change a duration of a presentation state or a non-presentation state of one or more display areas) using a remote receiver while a user is using the vision training system.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

In view of the many possible embodiments to which the principles of the disclosed technology may be applied, it should be recognized that the illustrated embodiments are only preferred examples and should not be taken as limiting the scope of the technology. Rather, the scope is defined by the following claims. We therefore claim all that comes within the scope and spirit of the appended claims.

The invention claimed is:

1. A vision training system, comprising:
   a visual signal source configured to transmit dynamic content;
   a flicker generator configured to receive the dynamic content from the visual signal source and adjust the flicker rate of the dynamic content as perceived by a user according to a duty cycle of a cycle, wherein the cycle is comprised of a presentation state of a first duration and a non-presentation state of a second duration;
a display device configured to receive the dynamic content from at least one of the visual signal source or the flicker generator, and further wherein the display device is configured to display dynamic content with a flicker rate between 3 Hz and 30 Hz in a display area; and
a receiver configured to receive a flicker-rate-adjustment indication, wherein the flicker-rate-adjustment indication is useable by the flicker generator to adjust the flicker rate of the dynamic content as displayed by the display device.

2. The vision training system of claim 1, wherein the visual signal source is configured to transmit a visual signal in the form of dynamic content or a visual signal in the form of dynamic content with gaps in time or space.

3. The vision training system of claim 1, wherein the cycle is comprised of a presentation state of a variable duration and a non-presentation state of a fixed duration to produce a flicker rate of 5 Hz.

4. The vision training system of claim 1, wherein the cycle is comprised of a presentation state of a fixed duration and a non-presentation state of a variable duration to produce a flicker rate of 5 Hz.

5. The vision training system of claim 1, wherein the cycle is comprised of a presentation state of a fixed duration and a non-presentation state of a fixed duration to produce a flicker rate of a variable frequency between 3 Hz and 30 Hz.

6. The vision training system of claim 1, wherein an obscuration pattern is applied to a portion of the display area at a second flicker rate.

7. The vision training system of claim 1, wherein the display device has a first display area configured to display a first flicker rate and a second display area configured to display a second flicker rate.

8. The vision training system of claim 7, wherein the flicker generator is configured to adjust the first flicker rate independently of the second flicker rate, and further wherein the receiver is configured to receive a first flicker-rate-adjustment indication for the first display area and a second flicker-rate adjustment indication for the second display area.

9. The vision training system of claim 1, wherein the display device comprises a plurality of display devices.

10. A vision training system, comprising:
a first display area configured to display dynamic content, the first display area being electrically switchable from a first visual output to a second visual output, wherein the cycling between the first visual output and the second visual output produces a first flicker rate;
a second display area also configured to display dynamic content, the second display area being electrically switchable from a third visual output to a fourth visual output, wherein cycling between the third visual output and the fourth visual output produces a second flicker rate;
a display driver associated with the first display area and the second display area that controls the first flicker rate and the second flicker rate, wherein the display driver controls the first flicker rate and the second flicker rate between 3 Hz and 40 Hz; and
a retaining device configured to retain the first display area and the second display area at a position relative to a user.

11. The vision training system of claim 10, wherein the display driver controls switching the first flicker rate independently of the second flicker rate.

12. The vision training system of claim 10, wherein the retaining device is positioned so that the first display area and the second display area are within 12 inches from the eyes of the user.

13. The vision training system of claim 10, wherein the display driver is either directly coupled to the retaining device or remotely coupled to the retaining device.

14. The vision training system of claim 10, wherein the first visual output and the third visual output are substantially a presentation state, and the second visual output and the fourth visual output are substantially a non-presentation state.

15. The vision training system of claim 10, wherein the first display area and the second display area are comprised of a shatter-resistant substrate and electrically switchable optical materials.

16. The vision training system of claim 15, wherein the electrically switchable optical materials comprise polymer dispersed liquid crystals, nematic liquid crystals, or cholesteric liquid crystals.

17. The vision training system of claim 10, wherein a receiver is configured to receive a flicker-rate-adjustment indication for the first display area and a flicker-rate-adjustment indication for the second display area.

18. The vision training system of claim 17, wherein the receiver is either directly coupled to the display device or remotely coupled to the display device.

19. A vision training system, comprising:
a display device able to display, to a user, dynamic visual content from a visual signal source, wherein the dynamic visual content is perceived by the user as having a flicker rate;
a display driver configured to adjust the flicker rate of the dynamic visual content based on a received flicker-rate-adjustment indication, wherein the flicker-rate-adjustment indication is useable by the display driver to adjust the flicker rate of the dynamic content;
the flicker rate is defined by a cycle that cycles through a presentation state and a non-presentation state, wherein the flicker rate is adjusted based on changing at least one of:
a duration of the presentation state,
a duration of the non-presentation state, or
a duration of the cycle; and
a receiver for receiving the flicker-rate-adjustment indication, wherein the flicker rate is adjustable by the display driver based on the flicker-rate-adjustment such that the cycle is between 3 Hz and 40 Hz.

20. The vision training system of claim 19, wherein the display device comprises a plurality of display devices, and further wherein at least a first display device of the plurality of display devices displays a flicker rate that is different from at least a second display device of the plurality of display devices.

* * * * *